US008483668B2

(12) United States Patent
Hurowitz et al.

(10) Patent No.: US 8,483,668 B2
(45) Date of Patent: Jul. 9, 2013

(54) CONTENT DELIVERY SYSTEM FOR MOBILE DEVICE

(76) Inventors: David A. Hurowitz, Scottsdale, AZ (US); Gregory F. Welteroth, Palm Beach, FL (US)

( * ) Notice: Subject to any disclaimer, the term of this patent is extended or adjusted under 35 U.S.C. 154(b) by 990 days.

(21) Appl. No.: 11/622,093

(22) Filed: Jan. 11, 2007

(65) Prior Publication Data

US 2008/0172291 A1 Jul. 17, 2008

(51) Int. Cl.
*H04M 3/42* (2006.01)

(52) U.S. Cl.
USPC ............... 455/414.1; 455/414.3; 705/14.1

(58) Field of Classification Search
USPC ...... 455/411, 433, 435.1–435.3, 456.1–456.3
See application file for complete search history.

(56) References Cited

U.S. PATENT DOCUMENTS

| | | | |
|---|---|---|---|
| 5,493,692 A * | 2/1996 | Theimer et al. ............. 455/26.1 |
| 5,710,886 A | 1/1998 | Christensen et al. | |
| 5,794,210 A | 8/1998 | Goldhaber | |
| 6,035,280 A * | 3/2000 | Christensen .................... 705/14 |
| 6,450,407 B1 | 9/2002 | Freeman et al. | |
| 6,604,086 B1 * | 8/2003 | Kolls .............................. 705/14 |
| 6,615,186 B1 | 9/2003 | Kolls | |
| 6,625,456 B1 * | 9/2003 | Busso et al. ............... 455/456.2 |
| 6,873,861 B2 | 3/2005 | Awada et al. | |
| 6,941,272 B2 | 9/2005 | Dutta | |
| 7,003,281 B1 | 2/2006 | Gamble | |
| 2002/0032035 A1 * | 3/2002 | Teshima ........................ 455/456 |
| 2002/0111164 A1 * | 8/2002 | Ritter ............................. 455/426 |
| 2002/0151305 A1 * | 10/2002 | Ward et al. .................... 455/436 |
| 2002/0161633 A1 | 10/2002 | Jacob et al. | |
| 2002/0173295 A1 * | 11/2002 | Nykanen et al. ............... 455/414 |
| 2002/0198777 A1 | 12/2002 | Yuasa | |
| 2003/0027555 A1 * | 2/2003 | Malackowski et al. ........ 455/414 |
| 2003/0055726 A1 | 3/2003 | Sohya et al. | |
| 2003/0233276 A1 | 12/2003 | Pearlman et al. | |
| 2004/0044774 A1 * | 3/2004 | Mangalik et al. ............. 709/227 |
| 2005/0216329 A1 * | 9/2005 | Handy-Bosma et al. ....... 705/14 |
| 2005/0266835 A1 * | 12/2005 | Agrawal et al. ............ 455/414.3 |
| 2006/0259415 A1 | 11/2006 | Satsukawa | |
| 2007/0220411 A1 | 9/2007 | Hauser | |
| 2009/0248507 A1 | 10/2009 | Hamaouri et al. | |
| 2011/0225417 A1 | 9/2011 | Maharajh et al. | |

FOREIGN PATENT DOCUMENTS

KR 2003026446 4/2003

* cited by examiner

*Primary Examiner* — Kashif Siddiqui
(74) *Attorney, Agent, or Firm* — Heslin Rothenberg Farley & Mesiti P.C.

(57) ABSTRACT

A content delivery system for a mobile device includes sending a program rating message to a first registered customer to query whether the first registered customer desires to rate content. The system delivers a program share message to the first registered customer to query whether the first registered customer desires to share the content. The system provides a list of friends to the first registered customer, whereupon the first registered customer selects a second registered customer from the list. The system delivers content to the second registered customer, providing an incentive to the first registered customer.

15 Claims, 22 Drawing Sheets

AGE
GENDER
INCOME
HOUSING (dwelling type, cost, location, etc.)
PHYSICAL ADDRESS
EDUCATION LEVELS
INTERESTS / HOBBIES
OCCUPATION
BRAND PREFERENCES
TRANSACTIONAL DATA (records of credit usage, retail activity, etc.)
POLITICAL AFFILIATIONS
ENTERTAINMENT PREFERENCES (movies, music, books, etc.)
LIFESTYLE
INTENT OF FUTURE PURCHASE (goods and / or services)
VEHICLE OWNERSHIP
LICENSES (recreational and / or professional)
UTILITIES USED
PROPERTY OWNERSHIP (real estate and / or other assets)
PET OWNERSHIP
VACATION, RECREATION, AND / OR TRAVEL PREFERENCES
PHILANTHROPIC INTERESTS AND / OR PARTICIPATION
OTHER DATA ELEMENTS AS NEEDED / REQUESTED

FIG. 7a

"DREAMING TO BUY"
"READY TO BUY"
"PLANNING TO BUY"

FIG. 7b

CATEGORY
PRODUCT
SERVICE
LOCATION
PRICING
DISTRIBUTION METHODS
SEASONALITY
SALES TRENDS AND / OR OTHER RETAIL ACTIVITY
AUDIENCE SPECIFICS
GOVERNMENTAL
POLITICAL
EXPOSURES
FREQUENCY
CREATIVE ELEMENTS (content)
OFFERS
DISCOUNTS
PROMOTIONS
PROGRAM TRACKING REQUESTS
OTHER DATA DEFINED BY COMPANY AND / OR USERS

FIG. 7c

COSTS
CONTACTS (incidents of Content delivery and / or viewing)
RESPONSES
SALES
REVENUES
RETAIL TRANSACTIONS
LOCATION OF TRANSACTION(S), REAL-TIME OR STATIC
RESPONSE DELAYS (a.k.a. "curve")
OTHER (as defined by Company and / or Users)

FIG. 7d

```
MG  =  GENERIC
MP  =  POLITICAL
MT  =  TOBACCO
MV  =  VIOLENCE
MS  =  ADULT
ML  =  LIBERAL
MAL =  ALTERNATIVE LIFESTYLE
```

FIG. 10

CONTENT DELIVERY SYSTEM FOR MOBILE DEVICE

CROSS-REFERENCE TO RELATED PATENT APPLICATIONS

The present patent application is related to co-pending U.S. patent application Ser. No. 11/622,085, entitled, "Data Delivered to Targeted Mobile Device" and filed concurrently herewith by David Hurowitz et al. The present patent application is further related to co-pending U.S. patent application Ser. No. 11/622,110 entitled, "Redemption System for Mobile Device" and filed concurrently herewith by David Hurowitz et al. The present patent application is further related to co-pending U.S. patent application Ser. No. 11/622,107 entitled, "Incentive System for Mobile Device" and filed concurrently herewith by David Hurowitz et al. The present patent application is further related to co-pending U.S. patent application Ser. No. 11/622,113 entitled "Bidding and Gift Registry System and Method for Mobile Device" and filed concurrently herewith by David Hurowitz, et al.

FIELD OF THE INVENTION

The present invention relates in general to mobile devices and systems and, more particularly, to an apparatus, system and method of organizing, delivering and receiving advertising, promotional material and other information to/from a targeted mobile device.

BACKGROUND OF THE INVENTION

Mobile devices such as cellular phones, personal desktop assistant (PDA) devices, Blackberry® devices and portable computing devices including notebooks, notepads and touchpads have become commonplace in today's society. It is not uncommon for a person to have at least a single mobile device accompanying the person at all times. Increasingly, persons are reliant on mobile devices for communication, information, and entertainment.

Cellular phones have traditionally been used to send and receive voice information, first in analog form, then in digital form. However, with increasing bandwidth, technology and processing power as mobile devices have become increasingly technologically sophisticated, cellular phones are becoming capable of handling additional data and other information transferring capabilities. In addition, functionality that was once regulated to fixed, desktop computers is becoming commonplace in mobile devices, and is seen more commonly in cellular phone-type devices.

At the same time that customers are looking to mobile devices for additional functionality and flexibility, vendors, marketers and other individuals are looking to provide the additional functionality and flexibility to the customer.

As of yet, developers have not taken complete advantage of the technology afforded to developers as incorporated into today's mobile devices. Persons who own mobile devices clearly make the devices unique to the person. The mobile device belongs to that person, and often incorporates the person's personality traits, for example in the choice of the person's ring tone. Vendors, marketers and others have not, as of yet, taken full advantage of the individuality that mobile devices exhibit.

In light of the foregoing, a need exists for a system and method of creating, organizing, delivering and receiving targeted information to/from a mobile device to take full advantage of the individuality of a mobile device.

SUMMARY OF THE INVENTION

In one embodiment, the present invention is a content delivery system for a mobile device, comprising, a database module for registering a plurality of registered customers in the system, a streaming module connected to the database module for serving content to the plurality of customers, and a priority module connected to the streaming module for implementing a content delivery schedule, wherein the streaming module delivers a first content notification to the first registered customer via the mobile device, whereupon if the first registered customer elects to receive the content, the first registered customer enters a PIN on the mobile device to enable the delivery of a content program constituting an assemblage of the content to the mobile device according to a first schedule implemented by the priority module, and the program concludes or is terminated by the first registered customer, the streaming module delivers a program rating message to the first registered customer to query whether the first registered customer desires to rate the content, whereupon if the first registered customer elects to rate the content, the database module records a first customer rating for statistical analysis, and the streaming module delivers a program share message to the first registered customer to query whether the first customer desires to share the content, whereupon if the first registered customer elects to share the content to a second registered customer, the database module provides to the first registered customer a list of friends of the first registered customer whereupon the first registered customer selects the second registered customer from the list, and the streaming module delivers a second content notification to the second registered customer, whereupon if the second registered customer elects to receive the content, the second registered customer enters a PIN on the mobile device to enable the delivery of the content program to the mobile device according to a second schedule implemented by the priority module, and the program concludes or is terminated by the second registered customer.

In another embodiment, the present invention is a method for delivering content to a mobile device, comprising delivering a first content notification to a first registered customer via the mobile device by a streaming module, whereupon if the first registered customer elects to receive the content, the first registered customer enters a PIN on the mobile device to enable the delivery of a content program constituting an assemblage of the content to the mobile device according to a schedule implemented by a priority module, the content program concluding or terminating by the first registered customer, delivering a program rating message to the first registered customer to query whether the first registered customer desires to rate the content, whereupon if the first registered customer elects to rate the content, the database module records a first customer rating for statistical analysis, delivering a program share message to the first registered customer to query whether the first registered customer desires to share the content, whereupon if the first registered customer elects to share the content to a second registered customer, providing the first registered customer a list of friends of the first registered customer, the first registered customer selecting the second registered customer from the provided list, and delivering a second content notification to the second registered customer, whereupon if the second registered customer elects to receive the content, the second registered customer enters a PIN on the mobile device to enable the delivery of the content program to the mobile device according to a second schedule implemented by the priority module, and the program concludes or is terminated by the second registered customer.

In another embodiment, the present invention is a computer program product usable with a programmable computer processor having a computer readable program code embodied therein, comprising computer readable program code which delivers a first content notification to a first registered customer via the mobile device by a streaming module, whereupon if the first registered customer elects to receive the content, the first registered customer enters a PIN on the mobile device to enable the delivery of a content program constituting an assemblage of the content to the mobile device according to a schedule implemented by a priority module, the content program concluding or terminating by the first registered customer, computer readable program code which delivers a program rating message to the first registered customer to query whether the first registered customer desires to rate the content, whereupon if the first registered customer elects to rate the content, the database module records a first customer rating for statistical analysis, computer readable program code which delivers a program share message to the first registered customer to query whether the first registered customer desires to share the content, whereupon if the first registered customer elects to share the content to a second registered customer, the first registered customer is provided a list of friends of the first registered customer, the first registered customer selecting the second registered customer from the provided list, and the second registered customer is delivered a second content notification, whereupon if the second registered customer elects to receive the content, the second registered customer enters a PIN on the mobile device to enable the delivery of the content program to the mobile device according to a second schedule implemented by the priority module, and the program concludes or is terminated by the second registered customer.

BRIEF DESCRIPTION OF THE DRAWINGS

In order to understand the advantages of the invention, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7a illustrates various example factors used by a data management system to determine a target customer;

FIG. 7b illustrates various example categories of customer at a particular time which can be used in a data management system to determine a target customer;

FIG. 7c illustrates various example factors which a data management system can utilize in determining a target customer or formulating content;

FIG. 7d illustrates example data which can be stored and analyzed by a data management system to appropriately determine a target customer;

FIG. 10 illustrates an example rating system of a data management system for a mobile device;

DETAILED DESCRIPTION OF THE DRAWINGS

Figure 1:
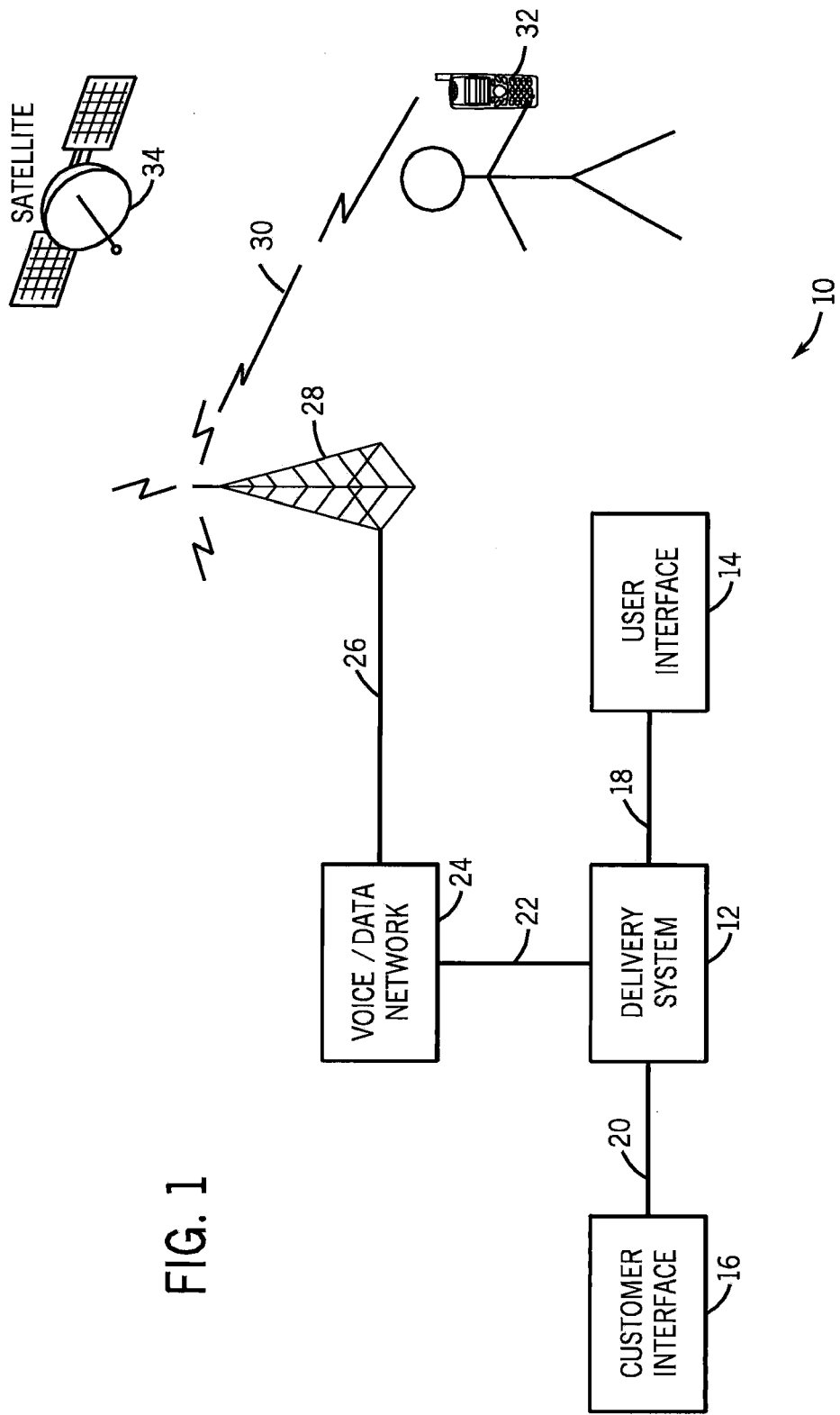
FIG. 1 illustrates an overall data management system for a mobile device including a data delivery network.

Many of the functional units described in this specification have been labeled as modules in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices, or the like.

Modules can also be implemented in software for execution by various types of processors. An identified module of executable code can, for instance, comprise one or more physical or logical blocks of computer instructions which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow-chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Throughout this specification, reference to the following terms is intended to refer to the following descriptions, although the following terms are not intended to be limited solely by such descriptions. In the following paragraphs, reference to a "user" is intended to refer to entities and persons who are seeking to deliver promotional content relating to a good or service, such as vendors, advertisers, etc., including company employees and personnel. Reference to a "customer" is intended to refer to customers who utilize services provided through a mobile device, such as subscribers to a cellular phone service, etc. Reference to an "audience" is intended to refer to customers and/or other individuals or groups who have, and have been granted permission to receive content. "Content" is intended to refer to advertising, marketing promotions, entertainment, dialogue, polls, or any other communication between users and customers.

Reference to a "dashboard" is intended to refer to a Web or other remote-based interface for users which facilitates delivery of content to audiences. Reference to "database(s)" is intended to refer to combined hardware and/or software designed to retain information submitted by (or compiled through commercial means) customers and then used to categorize, score (rank, for example) or otherwise group individuals. Further, databases will be used to create, deliver, report and/or analyze any content sent from system(s) to customers or other audiences.

Reference to "device(s)" is intended to describe hardware such as receivers, transmitters, data storage instruments, Internet based applications, etc. Reference to "program(s)" is intended to describe efforts by users either to draw a desired response from customers or simply deliver content to audiences and/or customers. Reference to "system(s)" describes proprietary software and hardware used by consumers, promoters, entertainers and/or advertisers.

"Target audience(s)" is intended to refer to individuals and/or groups of individuals who share similar attributes, including (but not limited to); demographics, lifestyles, product interests, intent to purchase specific categories of goods and/or services, etc. Finally, reference to "template" identifies a pre-defined design and/or textual element used to embody a communication. Users can select from pre-defined templates and customize the templates to the degree that satisfies their communication need.

FIG. 1 depicts an example system 10 for creating, organizing, storing, receiving and delivering content to a targeted mobile device. A central delivery system 12 is utilized in system 10 to organize, store, send, and receive content. Delivery system 12 includes a host of subcomponents which will be described in greater detail following.

System 10 includes a user interface 14 and a customer interface 16. User interface 14 is electrically connected via a signal bearing medium 18 to delivery system 12. Likewise, customer interface 16 is electrically connected via a signal bearing medium 20 to delivery system 12. User interface 14 and customer interface 16 can include personal computer devices, hand-held devices, PDA devices, "dumb" terminals, servers, workstations, or a host of other hardware/software variations capable of including a graphical user interface (GUI) to interface between a person and a computer system.

A signal bearing medium 22 electrically connects delivery system 12 with a voice/data network 24. The network 24 can include local-area-networks (LANs) or wide-area-networks (WANs). The network 24 can include preexisting network infrastructures, such as the world-wide-web. Network 24 can include components intended to transmit data using optical signals such as a fiber optic network.

Network 24 is electrically connected via a signal bearing medium 26 to transceiver tower 28. Tower 28 can include standard cellular phone towers having transmitting and receiving capabilities which are generally known in the art. Tower 28 can use such generally known multiplexing technologies as Code-Division-Multiple-Access (CDMA) or Time-Division-Multiple-Access (TDMA). Tower 28 can make use of generally known modulation technologies including a host of frequency-shift-keying (FSK) methodologies. Tower 28 can be compliant with a Global Standard for Mobile Communications (GSM) protocol in a variety of generations.

Tower 28 uses commonly known methods and technologies to transmit signal 30 to a mobile device 32. Mobile device 32 also can be capable of broadcasting a signal 30 to tower 28. Signal 30 can include modulated and/or multiplexed signals compliant with the technologies just described. Mobile device 32 can include such devices such as cellular phones, personal desktop assistant (PDA) devices, Blackberry® devices and portable computing devices including notebooks, notepads and touchpads. Mobile device 32 can include memory devices (not shown) such as a Subscriber Identity Module (SIM) card or an equivalent. Mobile device 32 can include memory devices having non-volatile memory such as flash memory.

Satellite 34 is shown positioned above mobile device 32. Satellite 34 can transmit a TDMA signal 30 that is compliant with a global positioning system (GPS) specification, and received by mobile device 32. Mobile device 32 can calculate a geographical location of the mobile device 32 which is sent via signal 30 to tower 28. The capabilities of mobile device 32 will be described in additional detail following.

Figure 2:
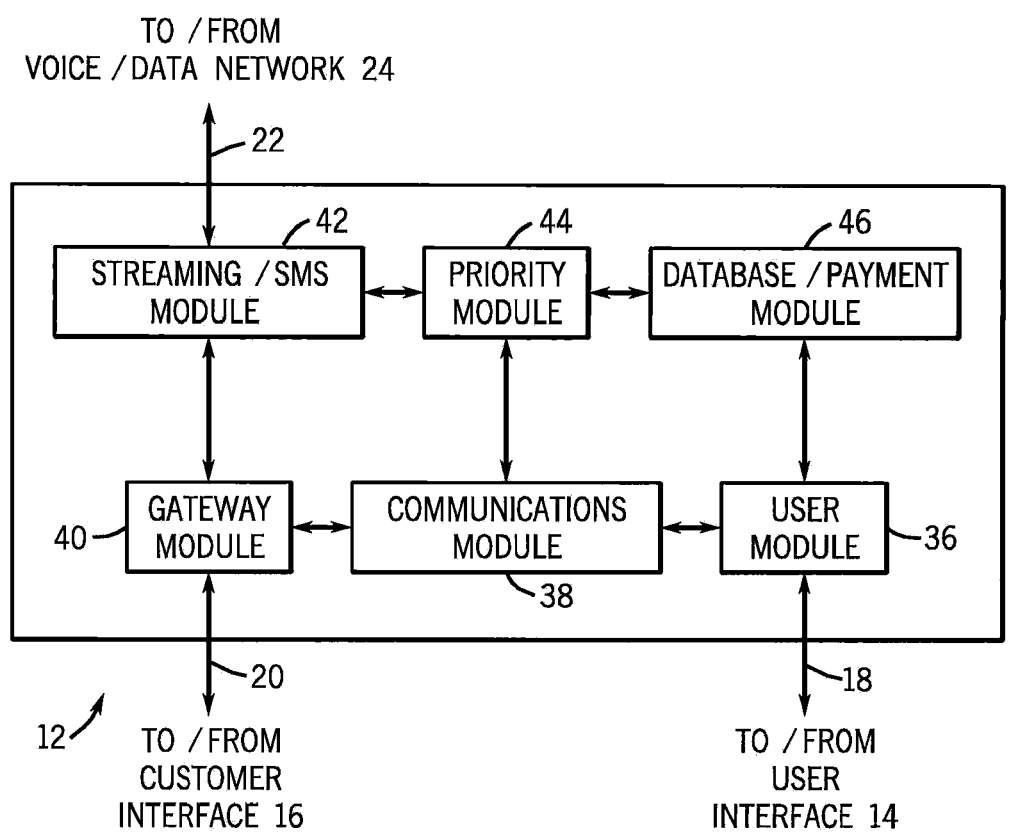
FIG. 2 illustrates a delivery system in a data management and delivery system for a mobile device, including a streaming module, priority module, database module, gateway module, communications module, and user module.

Turning to FIG. 2, a block diagram of an example delivery system 12 is depicted. Delivery system 12 includes signal bearing mediums 18, 20, and 22 as previously described which provide connections of various modules of system 12 to various outside interfaces and networks. User interface 14 is connected by medium 18 to user module 36. Also inclusive in system 12 are communications module 38, gateway module 40, streaming/short-message-service (SMS) module 42, priority module 44, and database/payment module 46. Each of the various modules can be interconnected via signal bearing mediums, communications channels, networks, and the like.

User module 36 provides a vehicle for users to organize and assemble content and other communications elements which is intended to be distributed to a customer. User module 36 is intended to be accessed by authorized users of system 12. Once a user has gained authorization and access system 12, components of content can be assembled when users make selections from existing communications elements (graphics, sounds, text, images, etc.). Users are also able to upload user-defined elements using module 36. The uploaded elements may be served or otherwise distributed to the customer "as is," or may be modified as allowed by the system 12. Modifications can include (but are not limited to), voice over (announcer) sound, text (such as business addresses, phone numbers, etc.), or other modifications required by the user (and allowed by the system).

User module 36 is electrically connected to communications module 38. Communications module 38 works in conjunction with user module to further customize content which is organized by a user. Communications module 38 can merge data, templated data, uploaded files, or other message components with customized user input to comprise a completed communication (finished content). The communications module 38 can be designed to accept uploads from outside feeds (links, static file uploads and the like). Communications module 38 can include storage capabilities to store informational elements in an onboard database or elsewhere for use in final assembly. Examples of user supplied content can include existing commercials, licensed images, photographs, sound tracks, music scores, voice-over (announcer) files, and other data.

Communications module 38 can convert individual components or finished content to usable, streaming format. Module 38, again, can store finished content for future use, distribution, analysis, etc. Module 38 can be adapted for "dynamic content building." In other words, the module 38 can assemble content based on individual target audience member attributes (music preference, ethnicity, past purchase behavior, etc.). Examples of target audience-based content include modification of background music for an advertisement based upon genre preference, or substituting a voice-over in Spanish, versus English (if language preference is Spanish), or a color of car featured in content based on past color selection of last auto purchased.

Module 38, as well as module 42, can also be configured to drive logic for "virtual short-message-service (SMS) conversations." If a customer responds a certain way to an SMS notification (of content pending), they may be responded to with a version of additional SMS content, and so on. The concept of virtual SMS communication over system 12 will be further described.

Module 38 can include an ability to assemble content using multiple users (advertisers, for example). In some cases, content can be delivered that features multiple products, services, brands, etc. In cases where the content of multiple users is assembled, module 38 can include prompts within the content which offers customers the opportunity to link to additional information, or choose to "purchase now." Module 38 can link to other system 12 components required for data feeds, response tracking and other functions.

User module 38 is also seen electrically connected to a database/payment module 46. Database/payment module 46 can include an onboard interface which serves as a primary system 12 interface for Customers. The onboard interface can work in conjunction with an initial customer interface 16 infrastructure. Module 46 can include a public-access region which is accessible by customers using a variety of methods, such as the world-wide-web (WWW). For example, a customer can use the WWW to access and update the system 12 through module 46.

Module 46 can host forms used to collect data from customers. The data may be entered directly by customers, or may be entered by company personnel. A customer may authorize a third party to enter respective data which is collected by module 46. Module 46 can contain a repository of all data collected from and/or derived about customers.

Module 46 can be configured to create a relationship between individual data elements, or groups of data elements for the purpose of target audience definition, program planning, post-program analysis, etc. The creation of relationships according to individual data elements can proceed in a manner which is generally known in the art, using traditional database architectures.

Module 46 can include a "fast-count engine" having the capability to tabulate records based on conditional queries. Module 46 can assign a target audience "tag" or identifier to records to be used in a compiled target audience. This tag becomes a relational key to match content to the intended target audience. Module 46 can offer customers the choice of preventing future messages or delivery of content from specific users (retailers, brands, etc.). In the case of a customer who chooses to block future content from a specific user, the customer can be tagged as ineligible for messages from the respective users.

Module 46 can, through links from various related modules in system 12, allow customers to "forward" content of interest to other selected customers (members), or groups of members, provided that other selected customers allow such transactions.

Through the module 46, customers are able to build profiles of others for certain purposes. For example, a customer may want to receive content appropriate for another person (customer or non-customer). In this case, module 46 can submit the customer into a target audience for the type of content appropriate for the profiled third party. This may be useful when shopping for gifts for friends, family, business associates and so on.

Module 46 can contain a "gift registry", and authorize other customers the opportunity to check for such a gift registry for gift ideas.

Customers can be authorized to utilize module 46 to request more content in a specific area of interest. For example, if a customer is actively seeking a new automobile, they may request content related to cars. Such a request would usurp typical system 12 restrictions of frequency of content to that customer.

Returning to FIG. 2, communications 38 is shown connected to gateway module 40. Gateway module 40 performs authentication functions to validate customer input on system 12. The gateway module 40, for example, can receive customer PIN entries (from the target audience members) to verify the customer's acceptance of the pending content.

Module 40 can be adapted to authenticate customer acceptance and then communicate with other system 12 modules such as the streaming module 42 to issue content to the customer. The gateway module 42 can output data to various other modules in system 12. Module 42 can indicate to other system 12 modules that the customer has requested delivery of respective content. Module 42 can validate data transmissions to prevent unauthorized access to the system 12.

Communications module 38 in example system 12 is shown connected to priority module 44. Priority module 44 can link with database/payment module 46 of system 12 to verify that a user has fulfilled payment requirements. Based on system 12 requirements, scheduling load, customer preferences and confirmation of payment, module 44 can schedule the delivery of the content to the target audience, and thereby, to a targeted customer in the target audience.

Module 44 can be configured to submit data to the streaming/SMS module 42, which in turn can submit messages to the customer device (mobile phone) via medium 22 over network 24 to alert the target audience member that content is waiting to be delivered for viewing. As such, module 44 can submit SMS content data to SMS module 42 for delivery to the customer. In addition to submitting SMS content data, module 44 can also submit streaming content data or similar content data to the module 42 for delivery to the customer.

Module 44 can receive input from database/payment module 46. The input can include such information as a customer's response to a previous communication, and can, in turn, cue subsequent (sequential) communications based on criteria defined in a particular variation or implementation of system 12.

Streaming/SMS module 42 can receive content data from priority module 44. The streaming/SMS module 42 can receive authorization from the gateway module 40 which indicates that a customer (target audience member) has granted permission to the system 12 to deliver the content to a mobile device 32 or elsewhere. Streaming/SMS module 42 then processes the data (the basic elements of the content) for delivery to the customer (target audience member), via the gateway module 40.

Streaming/SMS module 42 can be configured to deliver dynamic voice call linkage preceding, after, or during content delivery for the purpose of placing a voice call to a user's customer service department, the nearest retailer, etc.

After becoming authorized, users can access the user module 36 login to access the database/payment module 46. Once recognized by the user module 36, users can enter required data such as product/service category, retail location data, program geography, promotional values (discounts, for example), etc. The user module 36 can allow users to select (again, via the database/payment module 46) from an array of data attributes to help define target audience parameters such as gender, age, location, brand preference, intent to purchase a specific good and/or service, etc.

User module 36 can facilitate system 12 access necessary for content build, target audience definition, payment, and other operational needs. User module 36 can interface with the database/payment module 46, and communications module 38. User module 36 can interact with the database/payment module 46 or other related modules for program reporting and analysis.

User module 36 can repeatedly interface with the database/payment module 46 (possibly multiple times per program), based on the billing options selected in the setup of the program. An example of such repeated access includes performance-based payments (higher charges for positive response). User module 36 can employ locator technology (GPS, tower triangulation, etc.) to determine nearest user outlet/retail location to customers. Module 36 can therefore store data for the user's retail and/or distribution base.

The various functionality of each of modules 36, 38, 40, 42, 44, and 46 will be discussed in more detail, following. In addition, examples which describe the various interactions between the modules constituting system 12 and the overall delivery system 10 will be further discussed.

Figure 3:
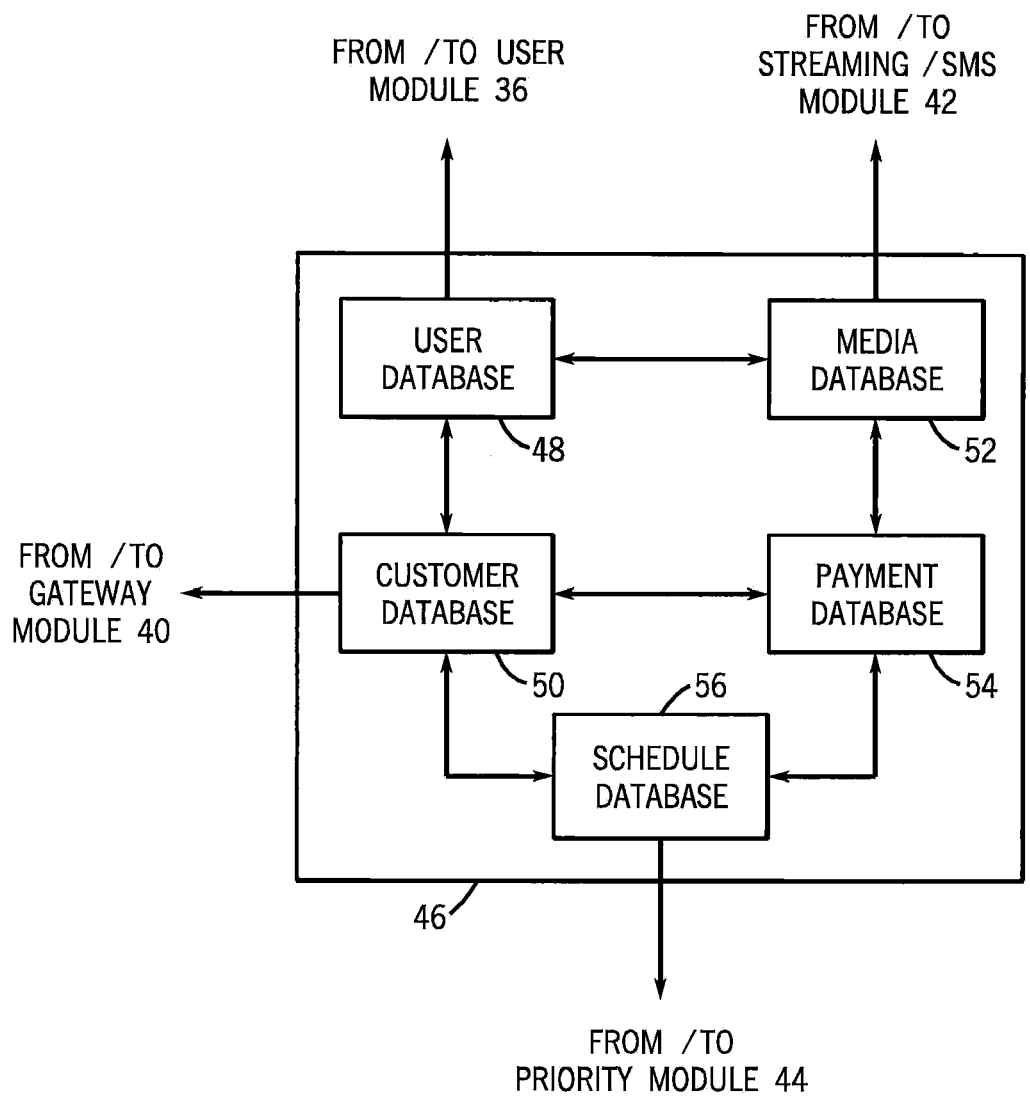
FIG. 3 illustrates an example database module, including various databases such as a user database, customer database, media database, payment database, and schedule database.

Turning to FIG. 3, a block diagram of database/payment module 46 is seen in greater detail, including an example set of subcomponents which make up module 46. Database/payment module 46 contains an organized collection of data. Module 46 can be organized according to a variety of models, such as a flat, hierarchical, network, or relational. Module 46 can incorporate such standards as structured query language (SQL) or similar standards known in the art. The various database platforms which can constitute module 46 can utilize software database drivers having application programming interfaces (APIs), examples of which include Java database connectivity (JDBC). The APIs can function to retrieve information stored in module 46 or any of the various subcomponents of module 46.

Module 46 is shown having various subcomponent databases. Module 46 can include additional databases or utilize organizational structures as needed to satisfy a particular application. User database 48 is shown having a connectivity to user module 36. User database can function to organize, store and retrieve data related to users, such as identification information associated with a particular registered user. A new user can utilize an example user interface 14 to access user module 36 and register user information which is stored in user database 48. In addition, user database can include a host of transactional information which has been stored from previous exchanges with customers to deliver content. The transactional information can be used to provide statistical analysis for future content delivery.

User database 48 is shown connected to customer database 50. Like user database 48, customer database 50 can be utilized to organize, store and retrieve data related to customers, such as identification information associated with a particular registered customer. A new customer can utilize an example customer interface 16 to register as a new customer on system 10. The new customer can provide identification information such as name, age, and preferences information. The information can be moved through system 12 to customer database 50 and stored on database 50.

Media database 52 is shown connected between user database 48 and payment database 54, while also sharing an outside connection from/to streaming/SMS module 42. Media database can be used to organize, store and retrieve content information which is organized by a user of system 10 and delivered to a customer. Content information can include SMS messages, voice, video, audio, or a combination of the foregoing.

Media database 52 is shown connected to payment database 56, which can function to organize, store and retrieve customer and/or user payment information. Payment database 56 can keep payment information such as credit card information of a particular customer on file, so as to enable a quick transaction between customer and user, customer and system 10, and/or user and system 10.

Payment database 56 is shown connected to schedule database 56. Communications module 38 can work closely with schedule database 56, located as part of database module 46, communications module 38, or elsewhere to schedule delivery of content through network 24 to a customer 32. Schedule database 56 can contain information pertaining to timing of delivery of content. Schedule database, for example, can include timeline information which specifies which content is delivered at a certain time, or in response to certain parameters, or in response to a customer or user's input into system 12. Database 56 is shown connected through module 46 from/to priority module 44.

Figure 4:
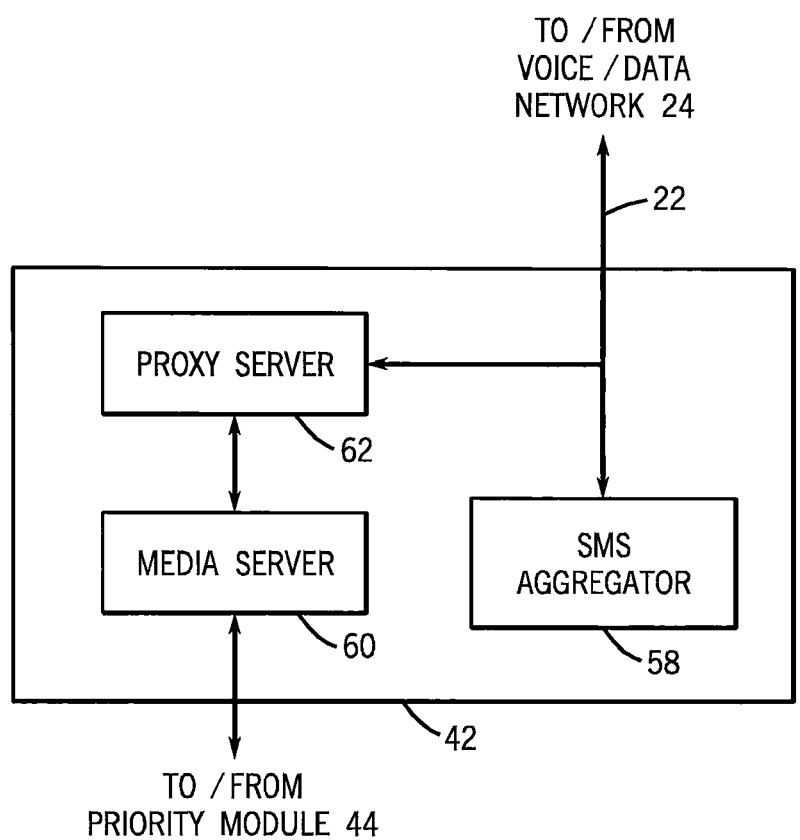
FIG. 4 illustrates an example streaming module, including a media server, proxy server, and short-message-service (SMS) aggregator.

Turning to FIG. 4, a block diagram of streaming/SMS module 42 is seen in greater detail, including an example set of subcomponents which make up module 42. Module 42 includes signal bearing connecting module 42 to voice/data network 24. SMS aggregator 58 is a module 42 subcomponent which can be hosted as part of module 42 or elsewhere. Aggregator 58 can be an independent third party which is located as part of network 24 to aggregate and deliver bulk SMS data over network 24. Alternatively, system 12 can host SMS aggregator 58 to aggregate SMS messages in bulk for delivery through network 24 to multiple customers.

Module 42 includes media server 60. Media server 60 can include a host of components which enable server 60 to serve content through module 42 and network 24 to a customer. The components can be compatible with various computer, communications, and signal protocols to enable content to be served appropriately. For example, media server can include subcomponents allowing the transfer of such standards as images compatible with JPEG or TIFF standards, video compatible with Moving Picture Experts Group (MPEG) standards in any variation or generation, etc.

Media server 60 is connected to proxy server 62 to allow clients (users, customers or system 12 operators) to make indirect network connections to other network services through module 42 and throughout system 12. The client can connect to the proxy server 62 through network 24 or elsewhere, then request a connection, file, or other content resource available on a different server or module. The proxy server 62 can provide the resource either by connecting to the specified module or server or by serving it from cache. In some cases, the proxy server 62 can alter the client's request or the server's response for various purposes. Server 62 can also act as a firewall for module 42 or for other system 12 subcomponents.

Figure 5:
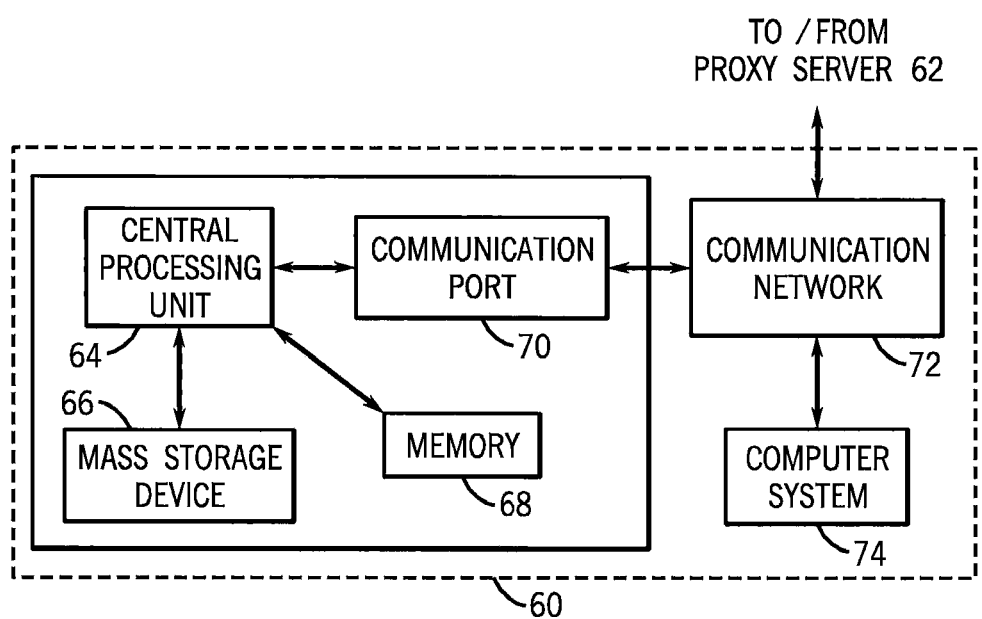
FIG. 5 illustrates an example media server having a central processing unit, mass storage device, communication port, memory, communication network, and/or computer system.

FIG. 5 illustrates a block diagram of various example subcomponents of media server 60. FIG. 5 can also serve to illustrate various example subcomponents of other modules in system 12. Media server 60 includes central processing unit (CPU) 64. CPU 64 can include a single or several processing units which are linked to perform computer tasks. CPU 64 is connected to a mass storage device 66. Device 66 can include a hard drive, or a series of hard drives which are configured in a redundant array of independent disks (RAID) topology or similar to store large amounts of data or other content information. CPU 64 connects to memory device 68. Memory device 68 can include nonvolatile memory such as flash memory or similar. CPU 64 is also shown connected to communication port, which allows two-way communication between CPU 64 and an outside communication network 72. Communication network 72 can include a host of networking components which are known in the art to provide communication over a network. Network 72 connects to a remote computer system 74 which may perform similar or different functions, but which can still be hosted on server 60. Network 72 is also coupled through module 60 to proxy server 62 to deliver and receive data from outside sources in system 12 or elsewhere.

Various examples of operation of delivery system 12 operating as part of overall system 10 will now be described. A first example A describes an overall method to design and develop, distribute, and analyze customer and/or target audience data over system 12. A user is first allowed to access company system(s) 10, 12 in order to compose content (an advertisement or other communication) and then distribute that message to a customer and/or target audience (individual or group(s)) over network 24 and elsewhere. As part of a next step to register a new user on system 12, the prospective user first completes an application (online form, hardcopy via mail-in, in-person, facsimile, or any other approved method) to become an authorized user. The process of registering a new user can occur through a computer device with a network terminal operating as a user interface 14. Alternatively, a system 12 operator can enter and otherwise upload the registration information to various modules operating as part of system 12. User interface 14 can have an associated graphical user interface (GUI) which assists the user in entering information into the computer device.

The user, as a next step, begins to compose a communication, or select a communication from provided templates. The user customizes the communication with any relevant text, images, sounds, vibrations or other modifications required to complete the content. The composition and customization of communication from templates can be performed using user module 36 and database module 46 operating on system 12.

As a next step, the user moves into a "Target Audience Definition" area of the site where the user will specify the profile of the target audience intended to receive the content. The user can elect to have the system 12 "recommend" a target audience (based on input by the user and/or company), or the user can make selections from a list of data elements available for the purpose of selecting a target audience.

The user then submits the selections, whereby the system 12 will provide a count of prospective recipients based upon the profile within the system 12. Users can select all, or a portion of the target audience. The user indicates the user's preference of the time period (approximate or exact date) the user wishes the communication to be delivered/begin to be delivered to the target audience.

As a next step, system 12, including various subcomponents of system 12, assesses (based on preset rules) members of the target audience to determine if the members are eligible to receive the particular content. The user pays for any fees and/or other charges using a credit card or other approved method of payment.

System 12 makes the content ready for distribution (in accordance with preset requirements and other parameters). When content is in the delivery process, target audience members receive notification (via their registered device) that content is waiting to be delivered. This notification can be sent as a communications signal through delivery system 12 over signal bearing medium 22, voice/data network 24, and signal bearing medium 26 to tower 28 where the signal is converted to radio frequency 30 and broadcast to mobile device 32.

System 12, as part of operating rules and parameters and at the discretion of system 12 operators, can elect to provide target audience members (customers/others) the opportunity to "opt-out" of certain types of content, including, but not limited to specific brands, categories of products and/or services, etc. For example, a customer may be dissatisfied with a current utility (electric company) and may wish to receive no further content from that company. Alternatively, customers can request specific information regarding specific products, brands, etc. For example, a customer may be in the market for a new car and electronically requests information and deals from local retailers.

As a next step, the intended target audience of the content elects to accept or skip the message(s) by indicating a preference on the registered device 32. If content is to be accepted, the target audience member authorizes delivery of content by entering a personal identification number (PIN) code on their registered device, indicating that the member authorizes delivery of content. Such an authenticating step can be performed through gateway module operating on system 12.

System 12 tracks the consumer's indication to record whether or not that target audience member elected to receive the content, storing the customer's indication as part of database module 46 or elsewhere in system 12. If the target audience member elects to receive the content, the content is delivered to the device 32 of the member. As a follow-up step, system 12 distributes additional messages, images or subsequent content based on the target audience member's response (a "digital coupon," for example) in accordance with the program definition and other predefined parameters.

System 12 compiles "response data" and retains the data for future use by the system 12 operators and/or authorized users. System 12 runs statistical reports, conducts analysis, or exports data in order to provide the users (or future or potential users) with analysis. System 12 also generates reports to aid in program analysis and/or recommendations to past, current and prospective users for marketing planning. Such statistical analysis can be performed using database module 46, user module 36, or a combination of modules incorporated into system 12.

In addition to an authorization process for a user, a customer also initiates his experience with system 12 through an authorization process where the customer registers himself in system 12 through the customer interface 16 and with the use of database module 46, or other system 12 subcomponents. Customers and/or target audience members can apply and register on system 12 in a "registration" area which can be served to the customer via database module 46 or similar. Again, module 46 can contain forms, templates, and other mechanisms to allow for a customer to enter information and thereby retain customer data. In many embodiments, the registration area can appear on a local GUI/customer interface 16 by virtue of the registration area served over the internet from a remote host. In addition, customers can complete hardcopy registration materials which can be mailed-in, phoned-in, or delivered in person. Customers can use a facsimile to provide information to a third party which enters the data into module 46 at a later date.

During the registration process of a customer, target audience members/customers can complete a personal profile and can offer other information that allows the system 12 to match the customer's interests (stated or derived) with content or other data, and manage transactions (purchases, fees, etc.). Potential target audience members/customers can be required to indemnify users, or to indemnify a third party regarding instances arising from use of a product which is promoted through various content over system 12.

Figure 6A:
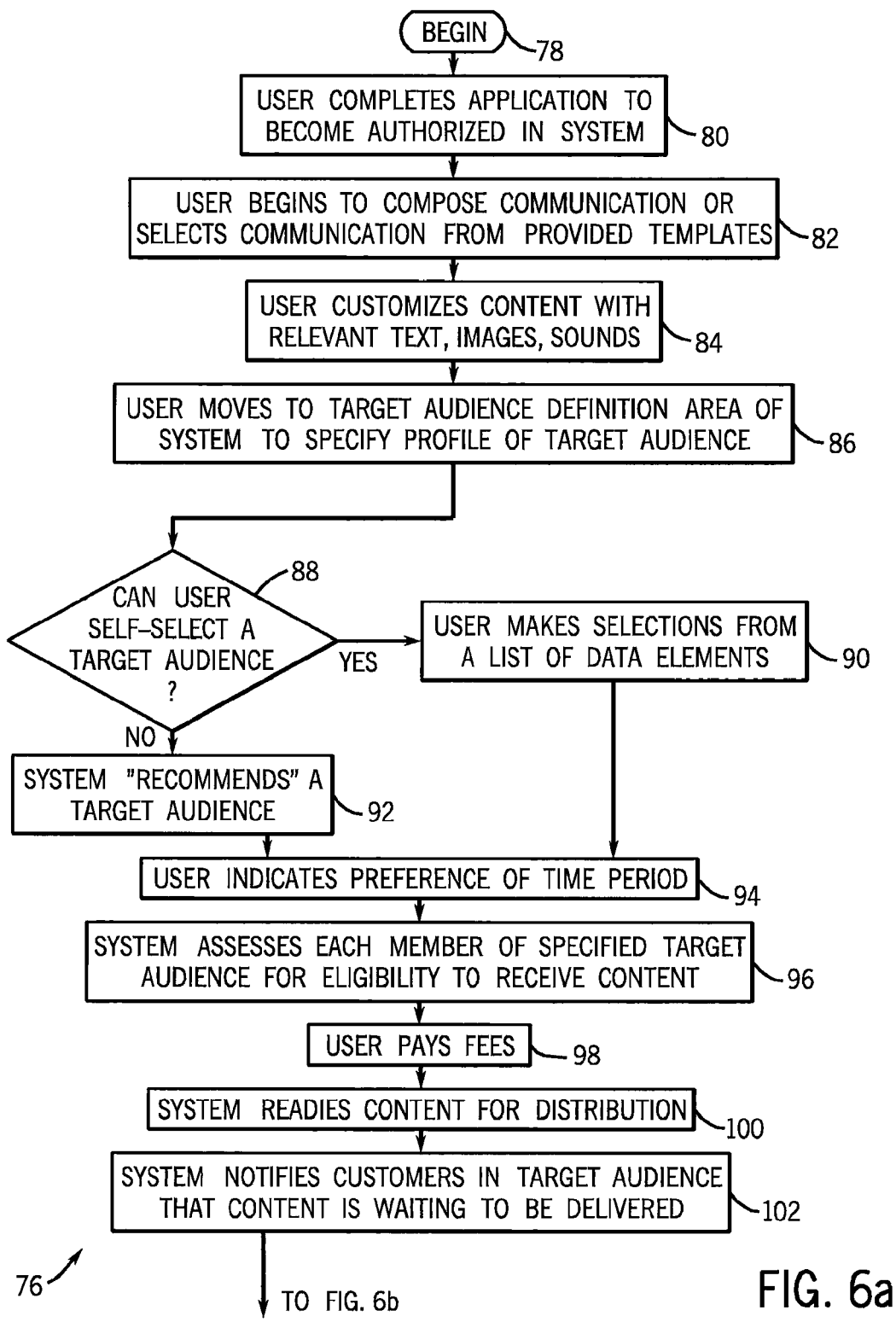
FIG. 6 illustrates an example method of data management according to the present invention.
Figure 6B:
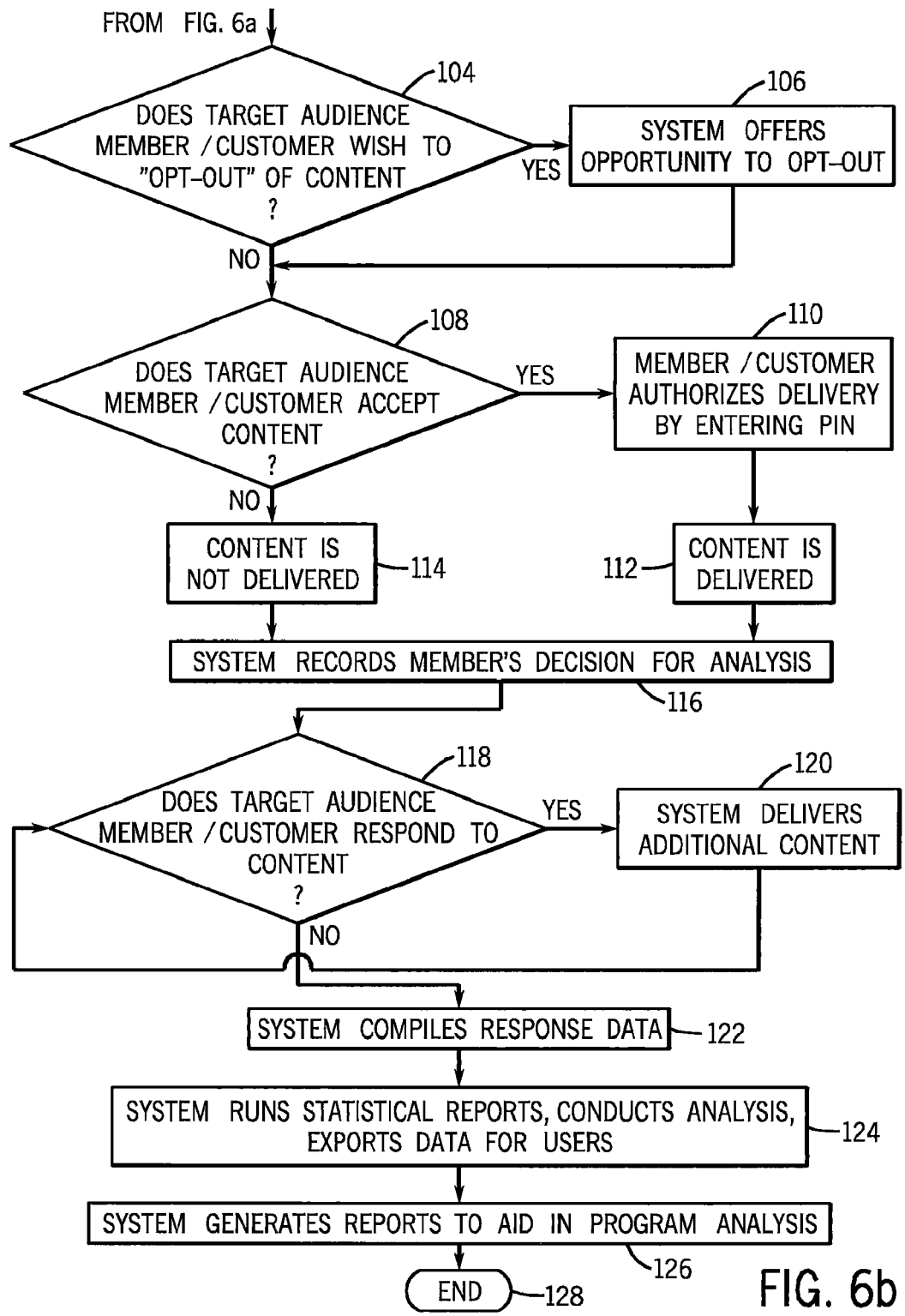

FIG. 6 illustrates example A in flowchart form, depicting an example method 76 of design and development, distribution, and analysis of data in a system 12. The method 76 begins (step 78) with an authorization process, as previously described. The user completes an application to become an authorized user of system 12 (step 80). Once a user is enabled to use the system to design and develop, assemble and distribute content to customers, the user can then begin to compose a communication that will be sent to target audience members/customers. The user can compose a communication, or select a communication from provided templates (step 82).

The user can then customize the communication by adding pictures, video, sound, vibrations, and other enhancements (step 84). For example, a particular communication might promote the release of a new vehicle model. The communication can be augmented by pictures or video of the vehicle to display the profile of the new vehicle to customers, or to showcase a particular feature, such as a roomy back seat or a built-in navigation system.

Assembling and augmenting content as described in steps 82 and 84 can be performed with the assistance of a "marketing center" which can be built into user module 36 and/or database module 46. The marketing center can consist of a series of web pages where users, or the company that they represent, can assemble content (advertisements, entertainment, etc.) prior to delivery to the customer (or other target audience). Of course, a company can reserve the right to approve or refuse content, and may, at the company's discretion, design, develop, and implement a rating system that indicates the type and/or nature of the communication. Such a "mobile rating system" will be described in further detail below.

Within the marketing center can reside a "marketing dashboard," which guides the user through content assembly, target audience definition and delivery options. Users can select from supplied or suggested options, or the users can enter information freely into the system 12 for inclusion into the final content. The dashboard can also include tools for users to upload existing message components (portions of content) via the Internet (or other electronic device), or otherwise supply, access and/or purchase stock images, text or other licensed elements for use in their finished content. The tools can include, but are not limited to, links to existing and/or future web sites (either owned by a company or owned by others), as well as proprietary tools necessary to capture, compile, manipulate or otherwise make ready for final use in finished content.

Returning to FIG. 6, once the user has finished customizing respective content for a particular communication, the user moves to a target audience definition area of the system 12 to specify a profile of the desired target audience (step 86). Target audiences can be identified when users of the system 12 select specific characteristics, or attributes of an individual or group of individuals. For example, an advertiser/user can access system 12 via the Internet over network 18. Once logged into a website of system 12, for example, the user can indicate that the user would like to deliver a commercial message to a target audience (consisting of one, or many intended recipients), based on factors such as the factors which appear in the table shown by FIG. 7a.

Relevant factors can include age, gender, income, housing, physical address, education level, interests/hobbies, and the like. The table of factors shown in FIG. 7a depicts an example list of factors. A user can select any or all of these factors to be taken into consideration when determining an appropriate target audience. The user can also specify additional factors which are specific to his or her business, such as desired physical intensity of a workout. The user can incorporate as many or as few factors as desired. If the user desires to self-select a target audience (step 88), the user then makes selections from a list of data elements (step 90) which, again, can include any of the example factors shown by FIG. 7a.

Throughout the design and development of content, delivery, and management of data that takes place in system 12, a user and/or customer can take advantage of "built-in" features of system 12 to perform work that a user or customer is not interested in performing or to help to better inform the user based on overall data accessible to system 12 but not necessarily accessible to a particular user or customer. As such, system 12 can statistically determine probabilities based on past activities within the system, and perform educated recommendations to users as to next steps. The educated recommendations can include suggestions of important design elements such as video, picture, or sound for a particular target audience group, or even a suggestion of a sample target audience itself (an "Instant Audience" service, thereby electing to have a target audience prescribed for them by the system 12) based on a particular product or application of the product. To perform statistical calculations to effect, provide "artificial intelligence" to system 12 and a user, system 12 can make use of any of the various modules of system 12, such as database module 46.

Database module 46 can execute instructions to perform statistical analysis of a particular user's past transaction histories, or module 46 can extrapolate statistical information from a collection of related users, such as all car dealers which are authorized users of system 12. Even though system 12 may have access to individual data records of users and customers, system 12 can include safeguards which ensure customer and user data privacy. Individual records, for example, may be safeguarded, while a population of non-private data can be used to extrapolate trends and for system 12 to perform educated recommendations. Thus, system 12 can perform an educated recommendation to suggest or predict a recommended target audience (step 92) if a user does not desire to self-select a target audience.

Target audience members may command different pricing to users wishing to reach the target audience members based on criteria such as response to previous programs or intent to purchase. System 12 can establish pricing tiers (or other pricing models) for target audience members which are similarly situated. FIG. 7b illustrates audience member categories established according to "value-in-time," such as "dreaming to buy," "ready to buy" and/or "planning to buy." System 12 can implement separate pricing models based on the categories depicted in FIG. 7b, or establish additional categories of target audience members which can be based on user selections, or established by system 12. System 12 can provide a count of all prospective recipients of content based on a target audience profile which is elected or confirmed by a user. The target audience profile can fall within one of the example value-in-time categories for pricing. Alternatively, system 12 can price content delivery by volume, taking into account a total number of prospective recipient customers and appropriately discounting when higher customer volume is concerned.

Returning to FIG. 6, once an appropriate target audience membership of customers is selected or confirmed by a user, the user can indicate a preference of time period (an approximate or exact date and/or time) that the user wishes the communication to commence to a customer (step 94). System 12 then assesses each member of a prospective target audience to determine if the member is eligible to receive content (step 86). The assessment step can take into account certain operational or transactional rules which are put into place by system 12. The operational rules can reflect customer preferences to opt-out as previously described, privacy policies established by system 12 or by law, or a variety of other constraints. Once the system 12 has completed the assessment step, it is ready to calculate a fee which includes all of the considerations previously described. The user then pays the calculated fees (step 98) to begin the content distribution process. The fees can be paid via credit card or another system 12—approved method of payment.

Once system 12 confirms payment for the services, system 12 then takes steps to prepare the content for delivery, in accordance with any system 12 policy (step 100). The content delivery process will be outlined in greater detail following. As part of the content delivery process, system 12 informs target audience members/customers through a notification process that the members have content which is available to be transmitted. The content is delivered through system 12, over network 24, eventually reaching a registered device 32. The notification process will also be described later in greater detail.

Again, system 12 can elect to provide target audience members with an opportunity to opt-out of certain types of content. A respective member can make an opt-out choice (step 104) resulting in system 12 providing an opt-out mechanism (106) to the member. The opt-out choice and mechanism can also be located as a preparatory step to selecting target audience membership by a user, and found earlier along method 76. Further, system 12 can make a decision as to which members are provided the opt-out choice based on a variety of factors.

When a member/customer receives notification from system 12 that content is waiting to be delivered, the member/customer then has a choice as to whether the member/customer will elect to accept the content (step 108). If the member/customer elects to receive the content, in one embodiment, the member/customer can authorize delivery by entering a personal identification number (PIN) into the device, thereupon content is delivered to the device (step 112). If a member/customer does not wish to accept the content, the content is not delivered (step 114). A mechanism such as PIN authorization allows system 12 to confirm that an authorized customer on an authorized or registered device 32 is viewing particular content. The PIN mechanism allows for privacy concerns to be maintained by system 12. In addition, sensitive content such as adult content can be safeguarded. Finally, users can be assured through an authorization system that the content that the user created was indeed delivered to a targeted individual, the very person that the user desires to deliver the content. The ability to deliver content in such a targeted manner adds significant value to the content and provides a significant return to the user designing and developing the content.

Whether a member/customer elected to receive the content and received the content, or the member/customer did not elect to receive the content and did not receive the content is recorded in system 12 for analysis (step 116). Such information can be retained in database module 46 in any of the various databases associated with module 46 and can be used to make educated recommendations, formulate trends, or perhaps determine future pricing for particular content over system 12.

The delivery of content to a particular member/customer is given additional value by the delivery of additional content which can be based on a member/customer's responses to initial content. Based on a customer's response, system 12 can deliver additional content. The delivery of additional content can make system 12, in conjunction with overall system 10, a powerful tool for users. For example, a particular customer can be targeted by system 12 because they are in a particular age demographic and like "slasher" type movies. A new release of a DVD movie in a fitting horror genre may be upcoming or already taking place. System 12 can deliver the notification that a well-known vendor of movies has content they wish to deliver to the customer. The targeted customer, recognizing the name of the well-known vendor, and based on past transactions with the vendor, can accept the delivery of content. The content includes a video clip preview of the movie. At the end of the preview, the content may query the targeted customer as to whether the customer is interested in receiving a coupon from the well-known vendor, which allows the customer to purchase the movie at a discount. If the customer responds positively, then system 12 can deliver the additional content, in this case an instant-savings coupon which allows the customer to save money on a purchase of the movie at the particular well-known vendor's store.

Additional examples of the interactive nature of the content delivery mechanism of system 12 will be described later, but for purposes of FIG. 6, if the customer responds to content (step 118), the system 12 can continue to deliver additional content (step 120). The additional content is based on the previous content. System 12 can continue to offer content and provide additional content based on positive responses from customers as desired to form an entire communication sequence with a customer, again, which will be further described. A series of communication sequences can be integrated into a content delivery "program", which can include an entire marketing scheme for a particular target audience.

When the communication sequence is terminated, either by reaching the end of the sequence or by the customer terminating the sequence prematurely by negatively responding to content, the system 12 then moves to evaluate the series of events which transpired by first compiling response data (step 122). Thereafter or at some time in the future, system 12 runs statistical reports, conducts analysis, and/or exports data in order to provide users with analysis (step 124). Additionally, system 12 generates reports to aid in program analysis and/or recommendations to past, current and prospective users for marketing planning (step 126). Method 76 then ends (step 128).

As part of wrapping up transactional data associated with a particular communication sequence or series of communication sequences, system 12 can include an "analysis center" which utilizes software executing on system 12 to provide interpretation of the data. The analysis center can be a feature which is built into the user module 36 and making use of user database 48, for example. The analysis center can be hosted by a server in system 12 and delivered via website over network 18 to user interface 14. In a website embodiment of the analysis center, information is provided to users over the web on how to interpret the results of previous and/or current content delivery programs. The information can be provided for the purpose of analysis or to impact current or future delivery programs.

An example analysis center can include data (quantitative and/or qualitative information) such as program response, conversion, cost per viewing, cost per response, cost per sale, top responder profiling, predictive models, or other information valuable to a user. System 12 can implement an additional pricing model where program analysis charges may apply to some, or all of the above services. Further, users may elect to use consulting services which integrate a representative of system 12 and the user to provide a complete analysis of previous programs and/or marketing plans for future programs.

To calculate, derive, extrapolate, or otherwise provide analysis of the data of a particular program or communication sequence, system 12 can utilize various databases, such as user database 48. User database 48 can include a relational database consisting of data supplied by, or derived from users. Examples of user data include categories as shown by FIG. 7c. Categories such as product, service, location, pricing, distribution methods and seasonality can be tied together by a relational key. In one embodiment, a relational key can include a mobile telephone number of an individual target audience member/customer. Stored procedures or similar executable code associated with the user database, can store how to perform common operations, such as gathering statistical information about usage patterns.

In addition to a relational database which can be used by users, database module 46 can also include a transactional database, integrated into payment database or elsewhere, which serves as a data repository used for operations and analysis. Transactions can include the examples as shown by FIG. 7d, such as costs, contacts, responses sales, revenues, and retail transactions. A transactional database can assist system 12 in post-program data management, such as generating statistical reports for a user. In addition, a series of transactions can be analyzed by system 12 to increase system 12 performance or to tailor a particular service of system 12 to a particular user.

Figure 8:
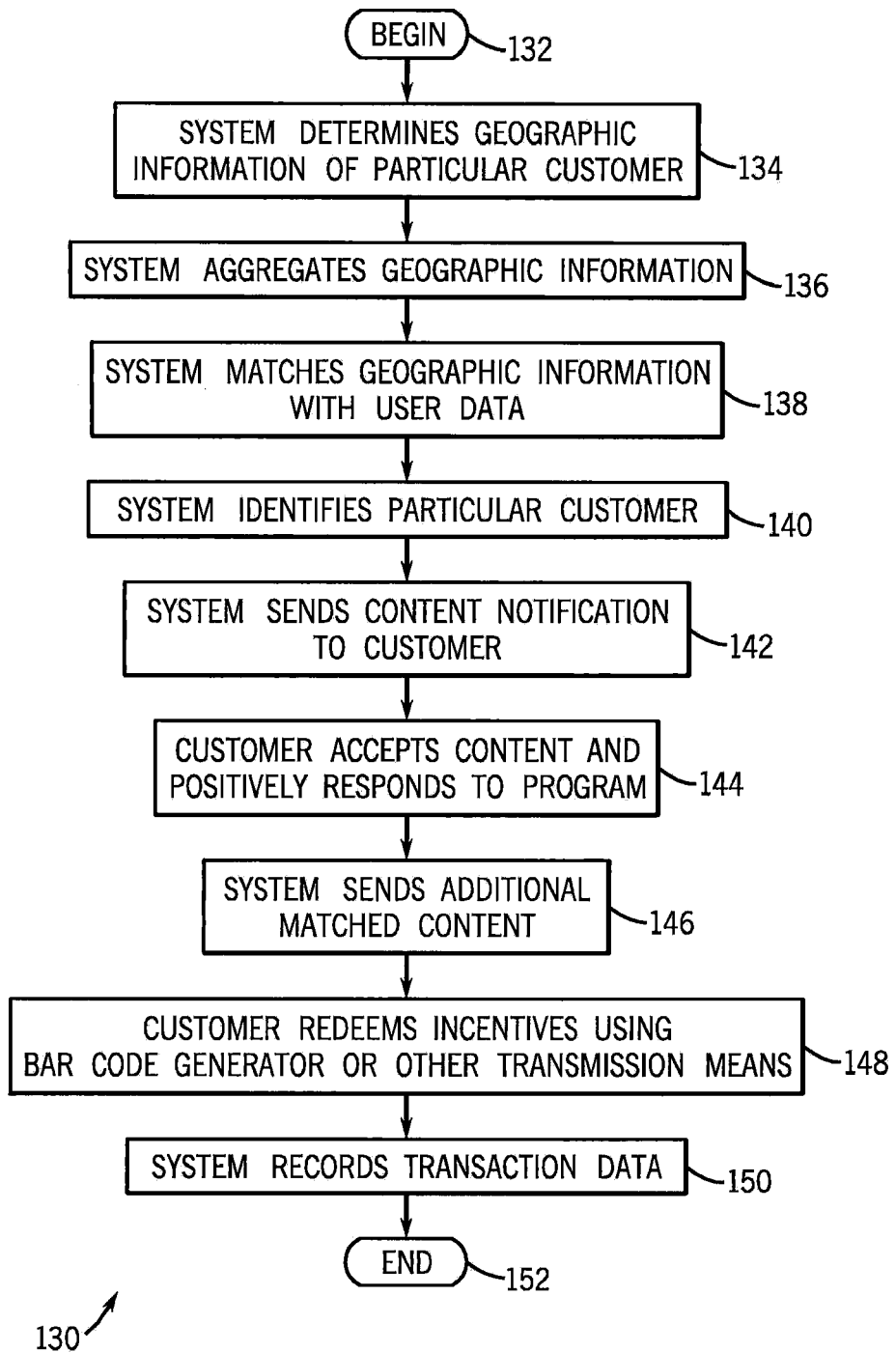
FIG. 8 illustrates an example method of operation of a data management system including a dynamic system of providing matched content.

Turning to FIG. 8, an example method 130 of dynamic content delivery to a mobile device 32 is depicted. System 12 has the ability to merge content which has been dynamically tailored by a user for a specific, targeted customer with geographic data about the targeted customer to provide for a content delivery system which is highly effective. Method 130 begins (step 132) by system 12 taking steps to determine geographic information of a customer or a plurality of customers (step 134). In one embodiment, system 12 can ascertain geographical location using GPS data which is sent to system 12 over network 24. As such, a mobile device 32 receives GPS signals from satellite 34. A processor on mobile device determines differences in time or in frequency of the signal's arrival to calculate a relative position in three-dimensional space. The mobile device 32 then regularly sends the location information to system 12. As part of a subscriber agreement with a customer, i.e., in exchange for reduced airtime charges or free mobile equipment, a customer can agree to opt-in to sharing geographical information with system 12 as described.

Once system 12 has received geographical information for a customer or a plurality of customers, system 12 then aggregates the data (step 136) to determine populations of customers in specified geographical areas. The aggregation calculation can be performed through the use of one or more modules, such as database module 46 on system 12. As part of the aggregation calculation, system 12 can match specified user information with customer populations (step 138). Including time-sensitive content can make the system 12 even more powerful. For example, a professional sports franchise, such as a baseball club, may have a game on a particular Sunday afternoon. For an unknown reason, ticket sales on that particular day are down, and the club would like to fill the stadium, making perhaps less revenue but more than if the stadium were left empty. A couple of hours before game time, the club may wish to target individual customers who are in the general location of the baseball field. The customers in the defined geographical area may be able to more easily attend the game with late notice, for example. As such, the user (baseball club) has prepared dynamic content which advertises the game (with accompanying video, sounds, etc.) The content may advertise tickets at ½ price.

System 12 matches the dynamic content which was built by the ball club with a targeted customer in a particular geographic location. A population of customers can be identified by system 12 that have a higher propensity to buy baseball tickets. For example, the customers may be interested in baseball, sports in general, have attended games in the past, etc. Factors which may or may not be selected by the club can come into play. Again, system 12 can make an educated recommendation based on data analysis. Once the population is identified and matched with user content, the system 12 then moves to identify particular customers in the specified population (step 140) to deliver the content. System 12 again can aggregate a list for each targeted customer to send content. System 12 can also implement additional time-sensitive delivery of content, where content advertising discounted prices are sent to certain customers at a certain time, and closer to game time, additional customers are targeted or additional content is sent.

System 12 then sends a content notification signal (SMS, etc.) to each of the targeted customers (step 142). Again, the notification can identify to a customer that content is waiting to be delivered. The customer then accepts the delivery (step 144). Returning to the example of a baseball club user, the content can include a short video which appears on the screen of the mobile device 32. The video can include a statement by a well-known player, inviting the customer to the game. The video can include footage narrated by the team's announcer, describing the opposing team and particular opposing players that the team will face.

Assuming that the customer responds positively to the program (again, step 144), the customer indicates by pressing a button or entering a four-digit PIN on mobile device 32. Content which is delivered to mobile device 32 can include executables, scripts, code, etc., that automatically run on mobile device 32 to provide interactivity to a customer. An example interface will be later described. If the customer indicates that the customer wishes to purchase the tickets, the notification is then sent over network 24 to system 12, where it is recorded. Again, a customer can enter a four-digit PIN to provide for the acceptance of content notification and/or for a positive response to content. User-developed content, once positively responded to, may trigger the delivery of additional, associated content (step 146). For example, the baseball club may have an agreement with a local restaurant or food vendor located inside the baseball field to share advertising costs or jointly promote goods and services through system 12.

If a customer positively responds to the ticket content, then system 12 can be programmed to send additional content to advertise beverages or food. A local vendor may advertise a special including two large beers, two bags of peanuts, and two hot dogs for ½ price to those customers which positively responded to ticket content from the ball club. A customer can then again interact with mobile device 32 to positively respond to the additional content. The delivery of additional, matched content can follow a prioritization scheme which can be implemented in conjunction with prioritization module 44 operating on system 12, or in conjunction with database module 46, also operating on system 12. Users can, with or without the help of system 12, implement the prioritization scheme to follow a planned schedule of delivery based on a particular program.

System 12 includes innovative means for a customer to redeem incentives stemming from positive responses to programs and content, which is referred to herein as a "redemption mechanism." Returning to the baseball example, a customer may have the actual tickets transmitted electronically through system 12, over network 24 to mobile device 32. In addition, a coupon for ½ off a food package can also be electronically transmitted over system 12 and network 24 to device 32. The electronic delivery of incentives, tickets and other data can proceed in a format which is compatible with known telecommunications equipment previously described. Here again, the electronic delivery of content can include added scripts, code, executables, and the like to securely handshake with a particular mobile device 32 to safely deliver data such as ticket information.

Once the customer reaches the baseball field, the customer can press a button on mobile device 32 which, in one embodiment, causes programs to execute on mobile device 32 to generate a bar code representation of the ticket as an example of a redemption mechanism or redemption activity using the device 32. The bar code is then displayed on the entire screen of the device 32. The tickets can then be read by a traditional bar code reader known in the art (step 148). In addition to containing means to generate a bar code on device 32, system 12 can instruct device 32 to deliver the electronic ticket data wirelessly over a known protocol such as Bluetooth, or even using a proprietary transmission means to deliver the electronic ticket information through device 32 to the gate. At the same time the customer redeems the various incentives the transaction data is sent to system 12 and recorded in various database modules for later analysis (step 150). Incentives are not limited to tickets, as described in the foregoing example. Incentives can include coupons, merchant "dollars" which are redeemable for goods or services of a particular user, and the like. Method 130 then ends (step 152).

Figure 9:
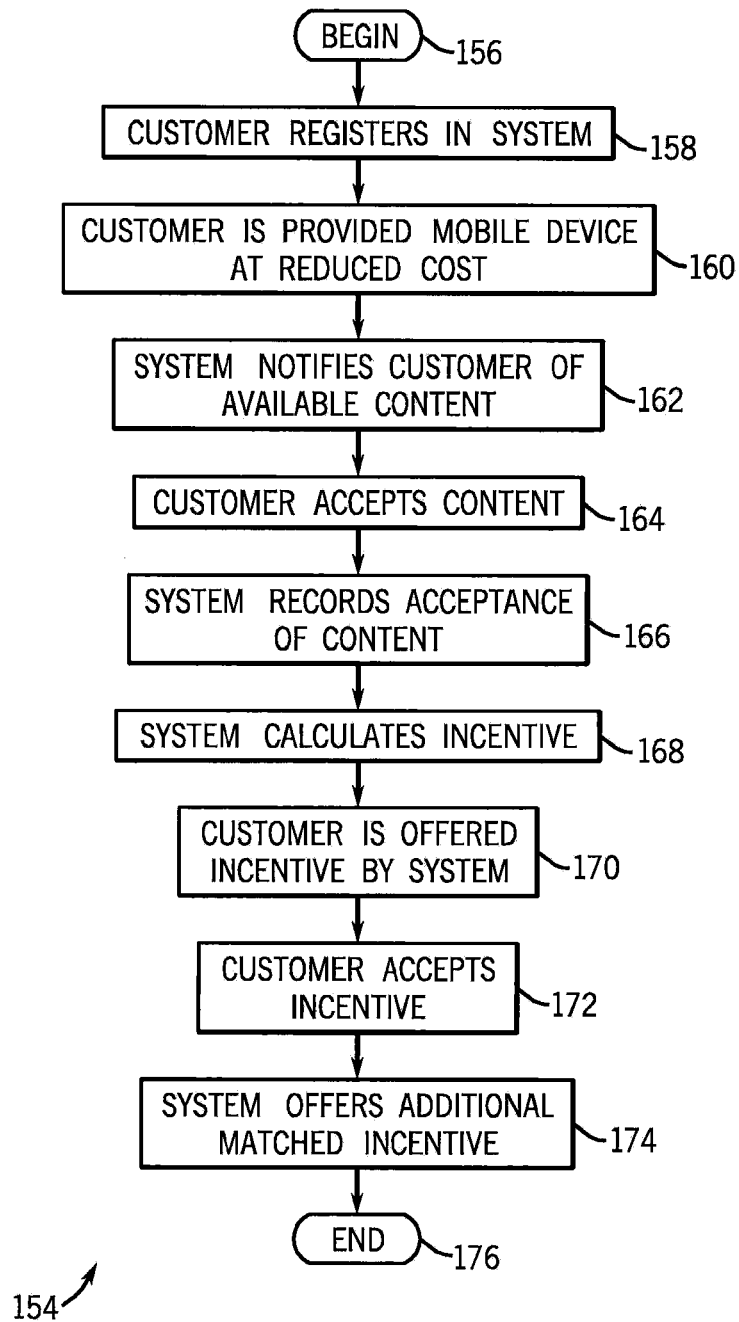
FIG. 9 illustrates an example method of operation of a data management system including a system of providing and redeeming incentives.

FIG. 9 illustrates another method 154 of operation in conjunction with system 12 and overall system 10. Method 154 begins (step 156) by a customer registering in the system 12 (step 158). The registration process can be similar to the process previously described. In exchange for registration in the system 12 and, for example, agreeing to receive content and/or to have geographical location information sent to system 12, the customer can be provided a mobile device 32 at free or reduced cost (step 160). The device 32 can be a device which is compatible with known cellular protocols as previously described. Additionally, device 32 can include proprietary software or hardware which enables content viewing or provided assistance with customer interactivity in light of a particular program or content. For example, a provided device 32 can be compatible with a newer wireless protocol such as WiMAX or an equivalent which allows for the transfer of information and data at broadband bandwidths. Device 32 can use a combination of protocols and/or transmitting and receiving means to deliver content to a customer and send information to/from the system 12.

Returning to FIG. 9, in a step similar to step 142 in FIG. 8, the system 12 can then notify the customer of available content (step 162), which the customer then accepts (164) by pressing a four-digit PIN on device 32 or in similar fashion. System 12 then records the acceptance of a program or particular content (step 166). Based on the program or content accepted by the customer, system 12 calculates a particular content-based incentive (step 168). The incentives can vary depending on a particular customer, particular user, or particular content. The content-based incentive can be structured to increase non-linearly as an amount or type of content is viewed by the customer.

The incentives can include free or reduced air time, for example. As a result, the more programs or content time which is viewed by a customer, the more reduced or free air time can be provided through system 12. Incentives can include coupons at retailers of the customer's choosing. Another example of an incentive can include a content time-based mileage system which rewards customers who view content in airline miles. In many cases, customers are in a position to view content provided through system 12 without incurring any hardship, such as waiting on commuter trains or sitting at a bus terminal. Many customers can view content as a source of entertainment while providing any number of incentives in return.

In some cases, an incentive can be tied by system 12 to the delivery of additional content. For example, a customer can be offered a particular incentive once the system 12 has determined that the customer has watched a specified number of minutes of content. The incentive can include tickets to a movie theater, the users thereof having partnered with system 12 to locate customers which are in close geographical proximity to deliver the particular content. System 12 can offer the customer the particular incentive (step 170), and the customer can then indicate his acceptance of the incentive (step 172). Here, in method 154 as in method 130, the system 12 can deliver additional matched incentives to the customer. For example, the same movie theater user can then, based on a favorable response by the customer, initiate a program which offers a discount on refreshments, such as a free bag of popcorn with any drink purchase (step 174). Method 154 then ends (176), although in some embodiments, the method may continue to provide matched additional incentives until the program ends or the customer declines to accept.

As previously mentioned, system 12 can include a corresponding "rating system" which allows customers to identify categories of content. Additionally, the customer can be presented with an option to opt-in or opt-out of certain kinds of rated content by system 12. Examples of types of content ratings according to a rating system are shown in FIG. 10. Example ratings include MG for "generic," MP for "political," MT for "tobacco," etc.

Figure 11:
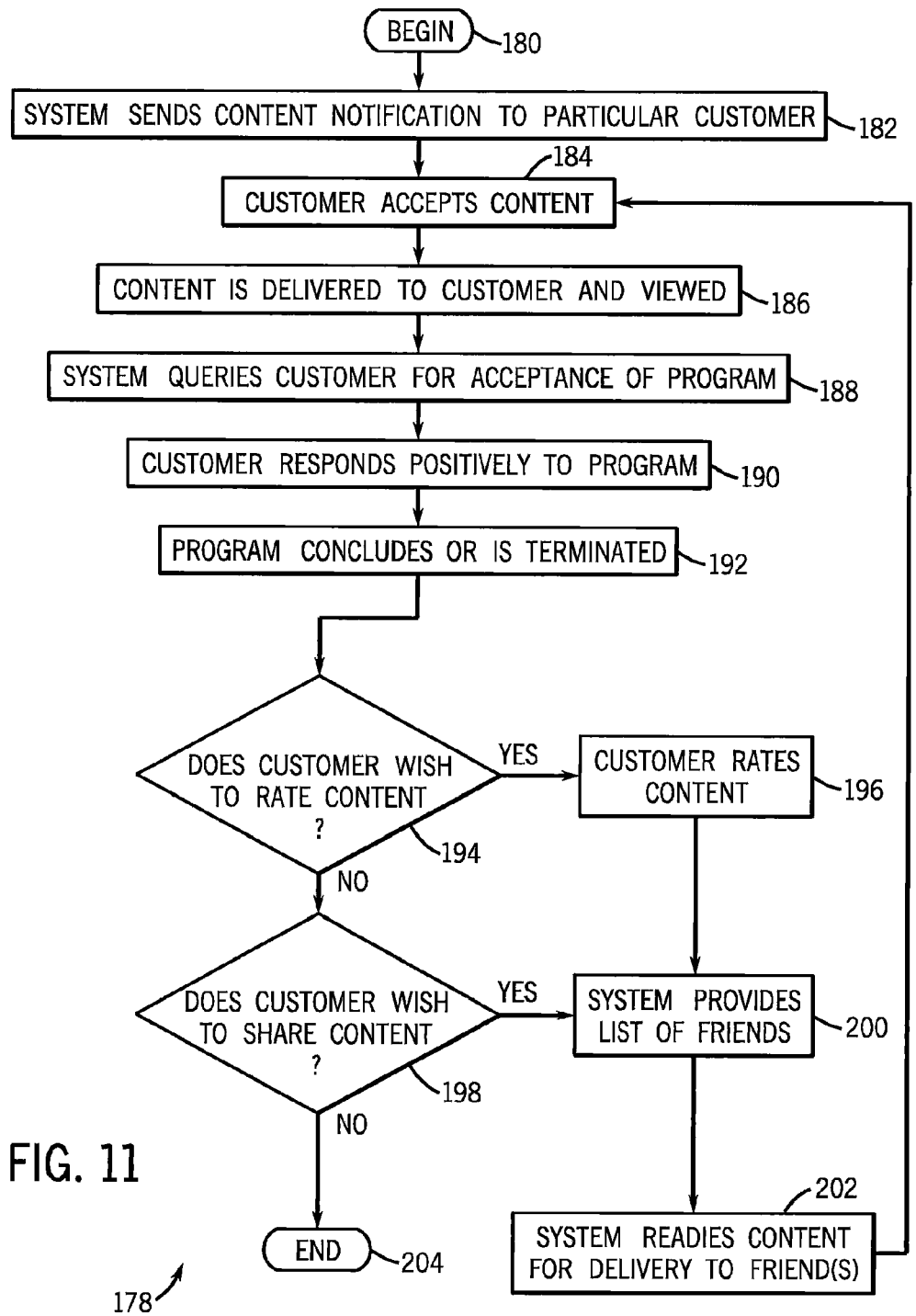
FIG. 11 illustrates an example method of operation of a data management system including a mechanism to share content.

System 12 can include a mechanism which allows for customers who receive certain content, and are enthusiastic about it, to share the content with a friend, family member, or associate. Such a mechanism is described in an example method 178 of operation depicted in FIG. 11. Method 178 begins (step 180) with the step of system 12 sending out a notification of availability of content to a particular customer, as in step 162 of method 154. Method 178 again assumes that the customer accepts content (step 184). The content is readied to be delivered, then delivered to the customer and viewed (step 186). As a next step, system 12 queries whether the customer would like to accept or positively respond to the object of the program (step 188). Again, the method 178 assumes that the customer has positively responded to the program (step 190). If a customer does not positively respond, the program is prematurely terminated and the transaction is recorded by system 12 (step 192). If the customer does positively respond, the program continues with the optional delivery of additional matched dynamic content until the program reaches a conclusion, or a customer declines a specific offer (again, step 192).

At the conclusion of a program, system 12 queries whether the customer wishes to rate the content or provide other feedback (step 192). Providing rating or other feedback can be beneficial to system 12 by relaying the rating information back to a particular user or by suggesting improvements in the delivery of the content by system 12. Providing rating for content can be tied by system 12 to additional incentives, such as air time or other promotions to encourage the practice. Such incentives can be offered to a customer by sending incentive content along with a query message asking the customer if they wish to rate the content.

If a customer decides to rate the content, then the customer proceeds to rate the content (step 196). If a customer declines to rate the content, system 12 then queries whether the customer wishes to share the content with another contact (step 198). The additional contact is preferably another customer who is registered on system 12. If the customer wishes to share the content, system 12 can provide a predetermined list of friends (step 200) based on past transactions, or based on the phone directory of a particular customer, or based on additional factors. The system 12 then readies content for the delivery (step 210). System 12 can provide educated recommendations to other customers registered with system 12 which have an association with the particular customer.

To encourage the concept of delivering content to as many potentially interested customers as possible, an incentive system can be itself tied to the delivery of content to contacts of the customer. Such incentive programs can include an overall discount in the product for both parties, should they elect to respond favorably to the content, or again, reduced or free air time to the referring party, or any number of related incentive options. System 12 can structure transactions such that, as more contacts of a particular customer elect to positively respond to the content, each customer receives a greater savings or incentive.

Method 178 continues indefinitely as customers refer other contact customers to particular content or a particular program, potentially triggering the delivery of additional matched content in a dynamic content delivery operation as previously described. Method 178 concludes for each respective customer when the respective customer declines to share the content (step 220). Again, system 12 then records the transactional data for further analysis.

Figure 12:
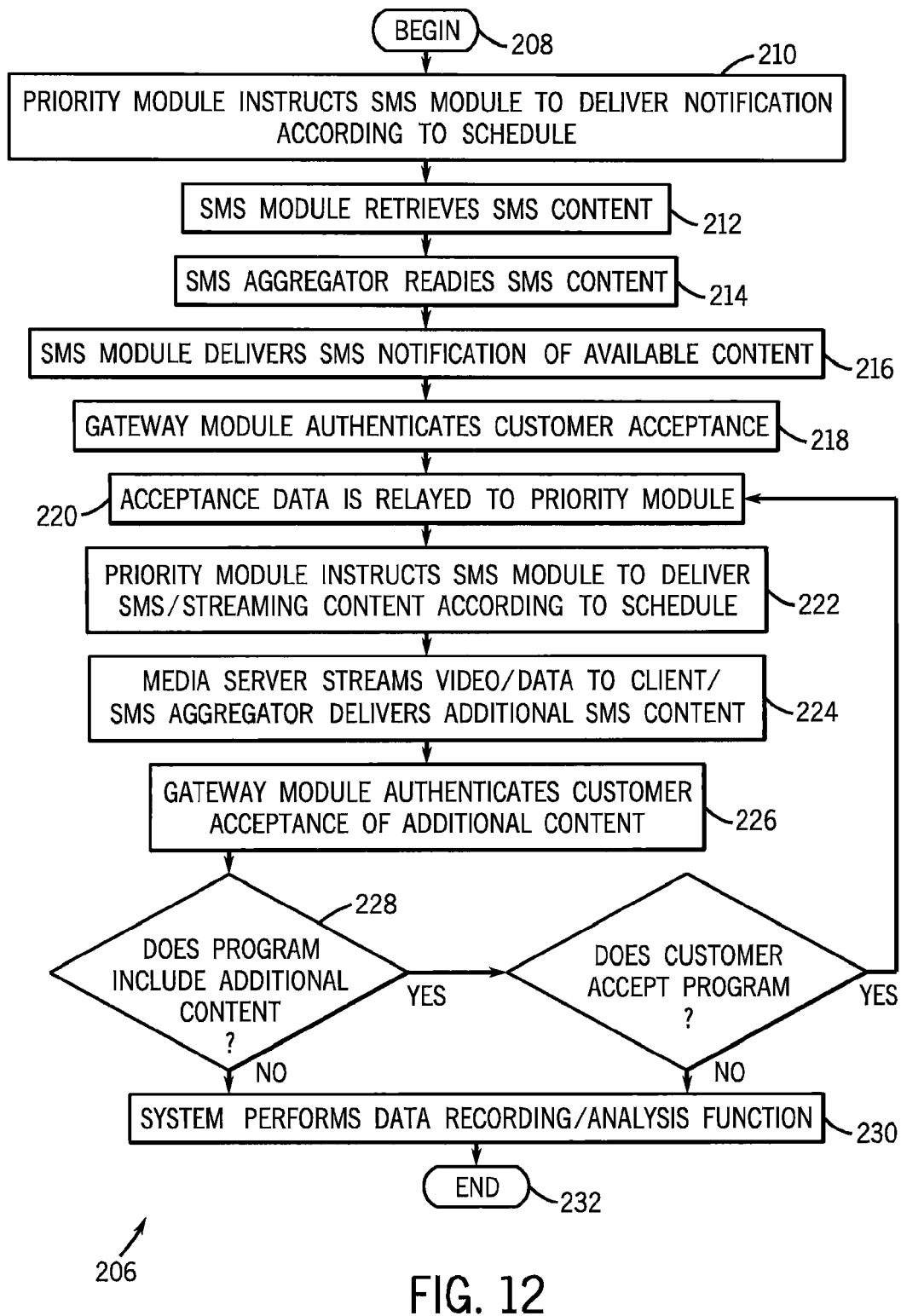
FIG. 12 illustrates an example method of operation of a data management system including a virtual SMS exchange with a target customer's mobile device.

Turning to FIG. 12, a method 206 illustrates an example virtual SMS communication for a particular program over system 12. The method 206 begins (step 208) with priority module 44 instructing SMS module 42 to deliver a content notification as previously described according to a delivery schedule implemented by module 44. Again, the content notification provides a communication that content is available to be viewed. In a next step, the SMS module 42 retrieves the SMS content (step 212), for example, by requesting the content from communications module 38 or elsewhere. The SMS content has been created by system 12, with or without the assistance of a user as part of an overall program of content and is stored in a location such as communications module 38 for retrieval at an appropriate time.

Again, according to the schedule implemented by priority module 44, the SMS module delivers the SMS notification of available content (step 216). The content is delivered over network 24 and viewed by a customer. Assuming the customer enters a PIN or otherwise indicates acceptance of the content, the gateway module 40 authenticates the customer's PIN or other method of acceptance by comparing with information which may be stored as part of gateway module 40, database module 46, or elsewhere (step 218). Once authenticated, the customer's positive response is relayed to the priority module 44 (step 220). Module 44 receives the response data, and based on a predetermined schedule, then instructs the SMS module to deliver additional SMS content and/or streaming content according to the schedule (step 222). The additional SMS or streaming content can include so-called "matched" content from the same or different user having a relationship with the first user.

The instructions to deliver SMS content or streaming content are delivered to media server 60 located on module 42 and/or SMS aggregator 58, also located on module 42 or elsewhere. As a result, the media server 60 streams video and/or associated data and information to the client (mobile device 32), and/or the SMS aggregator 58 sends additional SMS data (step 224). Again, assuming that the customer responds positively to the matched content, the gateway module again authenticates the acceptance (step 226). If the program includes additional content (step 228) and the customer accepts the additional content (step 229), then the acceptance data is again relayed to the priority module (step 220) and the program continues. If the program terminates because the program itself concluded (step 228) or the customer prematurely terminated the program (step 229), then system 12 performs the data analysis and recording functions which have previously been described (step 230). The method 206 then ends (step 232).

Figure 13A:
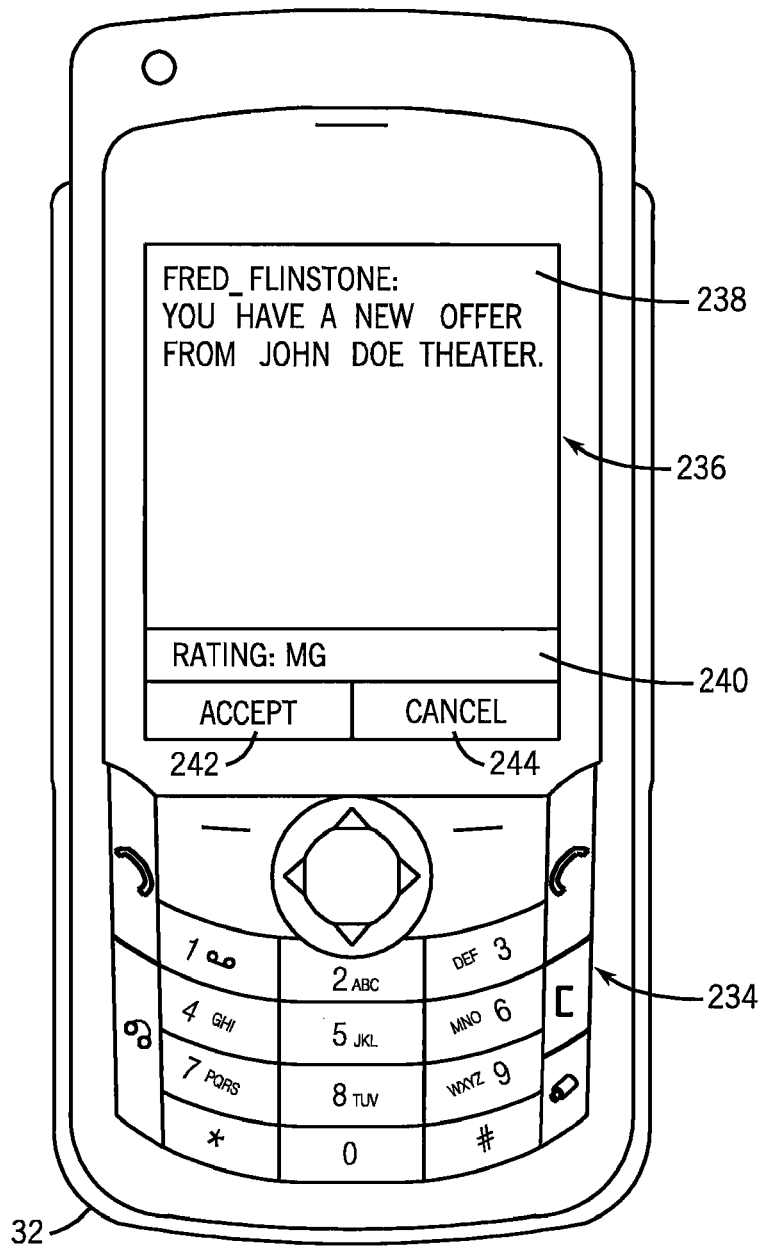
FIG. 13a illustrates a first example graphical-user-interface (GUI) screen of a mobile device showing a first SMS notification.

FIGS. 13*a*-13*f* depict an example graphical user interface (GUI) display of a mobile device 32 throughout a virtual SMS operation and/or delivery of content as has been described. FIG. 13*a* depicts a mobile device 32 with an incorporated keypad 234 and display 236. Keypad 234 can include a numeric, alpha-numeric, or alphabet key scheme. Display 236 can include liquid crystal displays commonly known in the art. Additionally, display 236 can include touchscreen capabilities to provide additional functionality when used in conjunction with system 12. The display 236 of device 32 is broken into sections 238, 240, 242, and 244, which provide the illustrated functionality. Section 238 illustrates an example SMS notification communication which has been delivered by system 12 over network 24. The SMS notification invites the customer to view a particular offer from a theater which is located in a geographical location proximate to the customer. The theater/user can target the customer because of the customer's location to the theater, as well as a variety of additional factors which have been described.

Section 240 depicts the mobile content rating system which has been previously described. System 12 can indicate that particular content is, such as this case, generic for viewing purposes. In addition to sections 238 and 240, system 12 can implement a variety of windows, screens, graphical images, video, audio, etc. in accordance with a particular program. In the embodiment shown, sections 242 and 244 provide for "accept" and "cancel" decision functionality. Again, however, various screens and choices can be included to tailor the delivery of material to the dynamic content assembled by system 12 and/or a particular user.

Figure 13B:
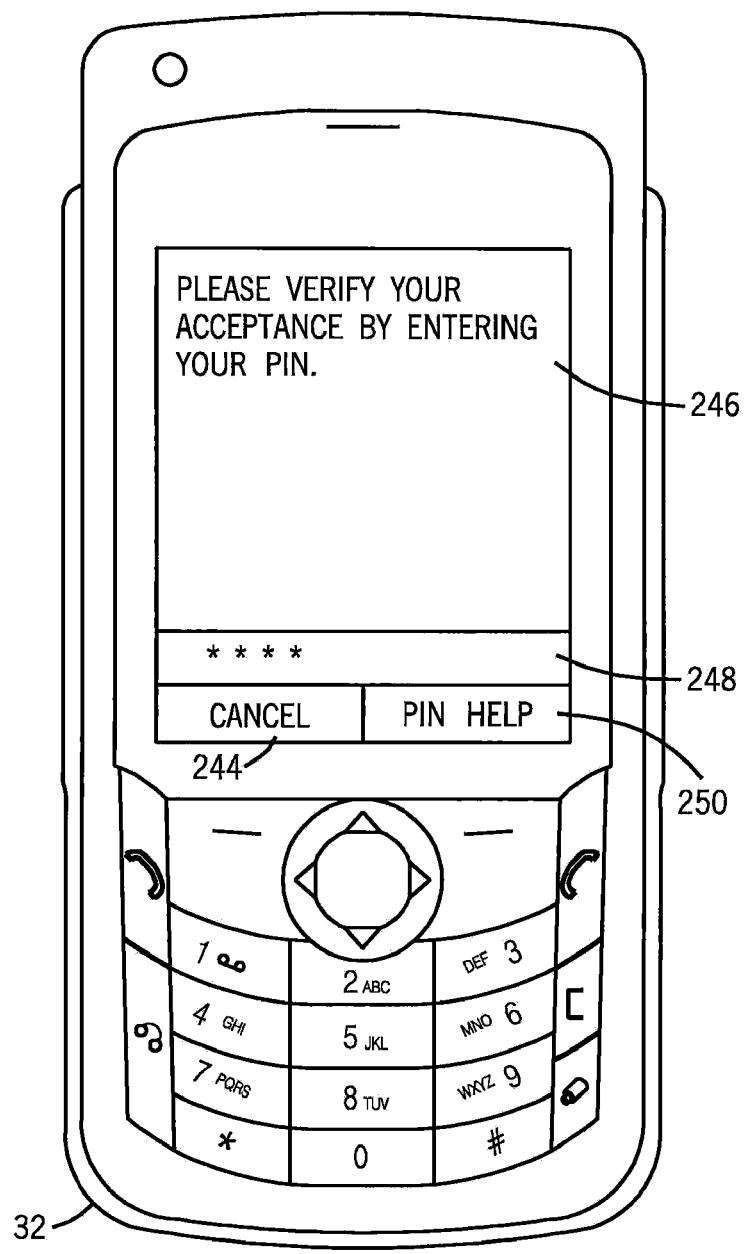
FIG. 13b illustrates a second example GUI screen of a mobile device showing a verification step.

Turning to FIG. 13*b*, the customer has accepted the delivery of content. In accordance with method 76, 130, 154 and/or 206, system 12 then queries the customer for a four-digit PIN to verify identity in section 246. Section 248 depicts the "star" characters which commonly are programmed to appear when an identification code is entered into a remote system. Again, device 32 again includes cancel functionality in the embodiment shown, as well as a "PIN help" section 250 designed to assist a customer with the retrieval of PIN information if the information is misplaced by a customer.

Figure 13C:
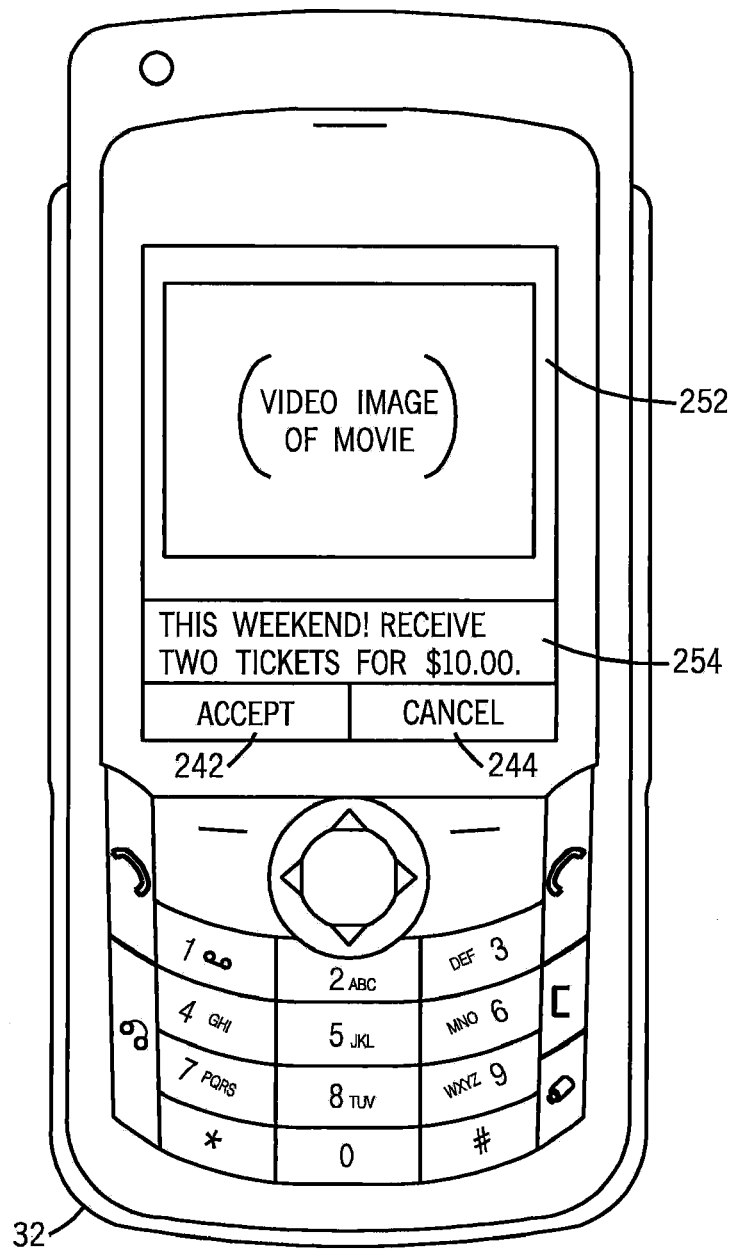
FIG. 13c illustrates a third example GUI screen of a mobile device showing the delivery of content.

FIG. 13*c* depicts a next image with accompanying screens 252 and 254, which display the streaming and/or SMS content which has been delivered to the device 32. In the particular embodiment shown, the content includes a video clip preview of an upcoming movie (section 252), as well as a text invitation to accept an offer for two passes for $10.00 (section 254), with the accompanying accept 242 and cancel 244 functionality.

Figure 13D:
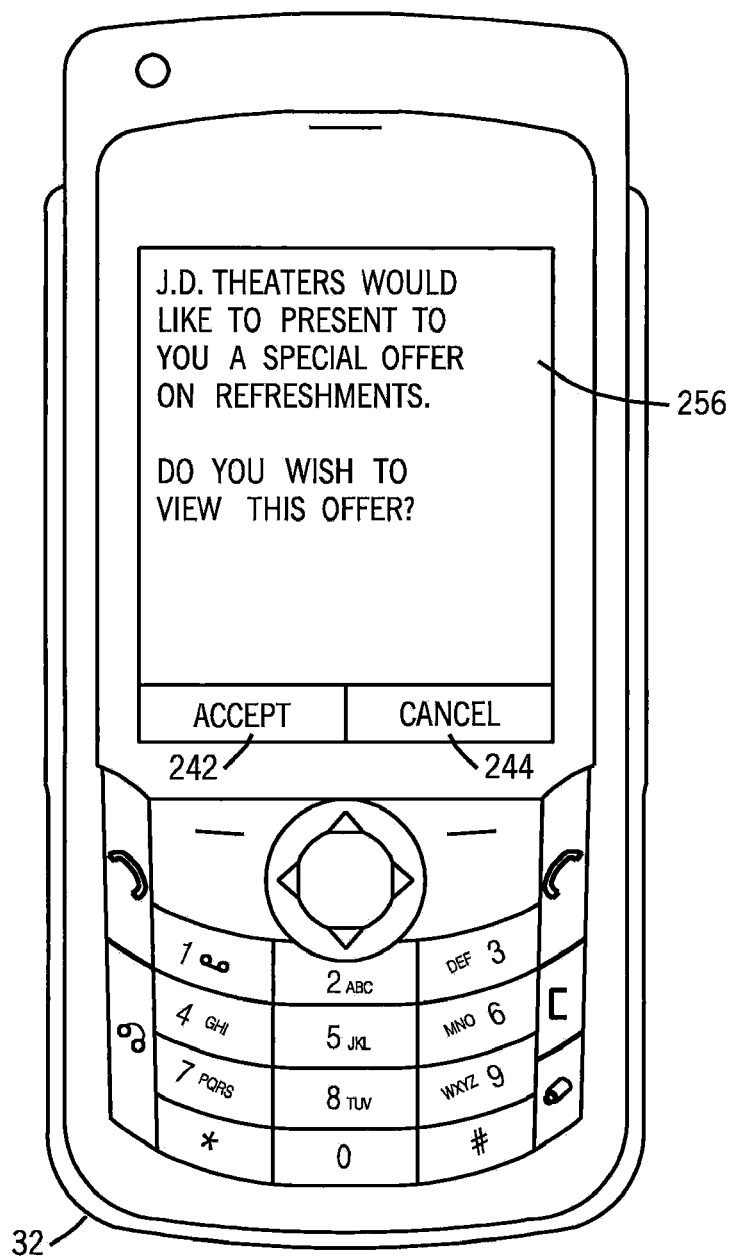
FIG. 13d illustrates a fourth example GUI screen of a mobile device showing a second SMS notification.

Assuming that the customer positively responds to the offer presented, the particular program shown continues in FIG. 13*d* with the notification and/or delivery of matched content. In the embodiment shown, the program includes the matched content of an additional refreshment offer by the theater chain (section 256). Here again, the accompanying accept 242 and cancel 244 functionality is presented.

Figure 13E:
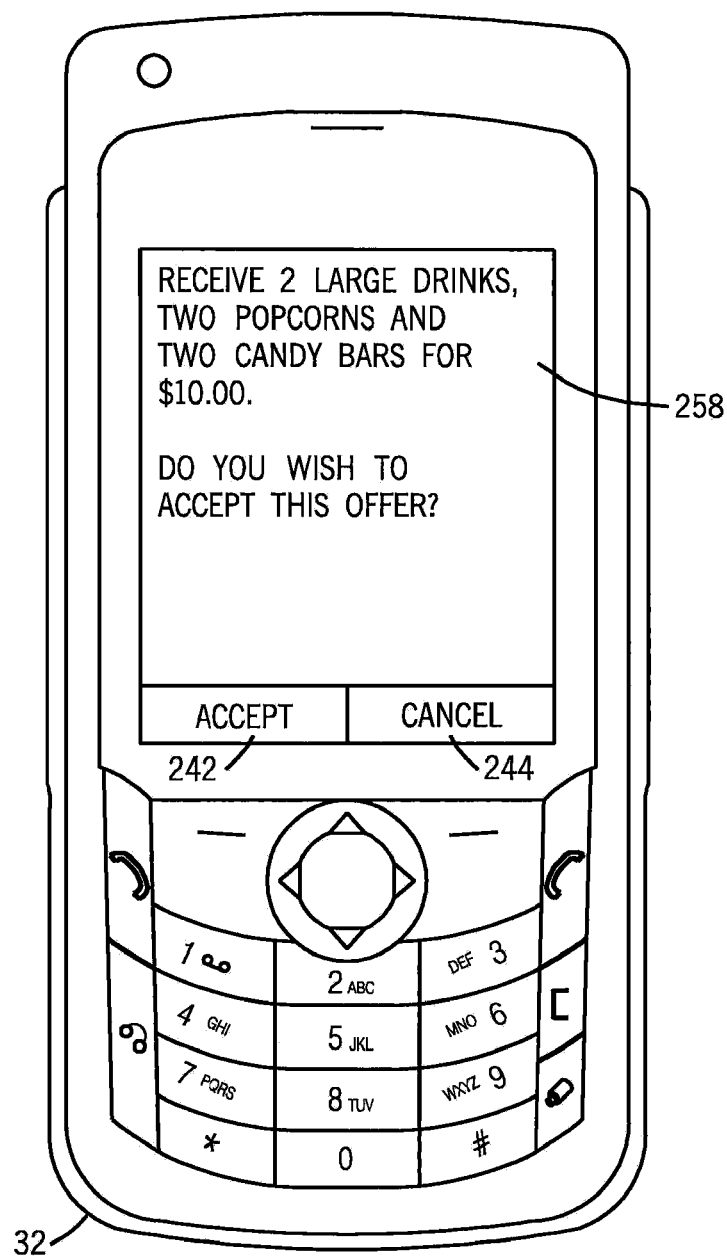
FIG. 13e illustrates a fifth example GUI screen of a mobile device showing the delivery of matched content.
Figure 13F:
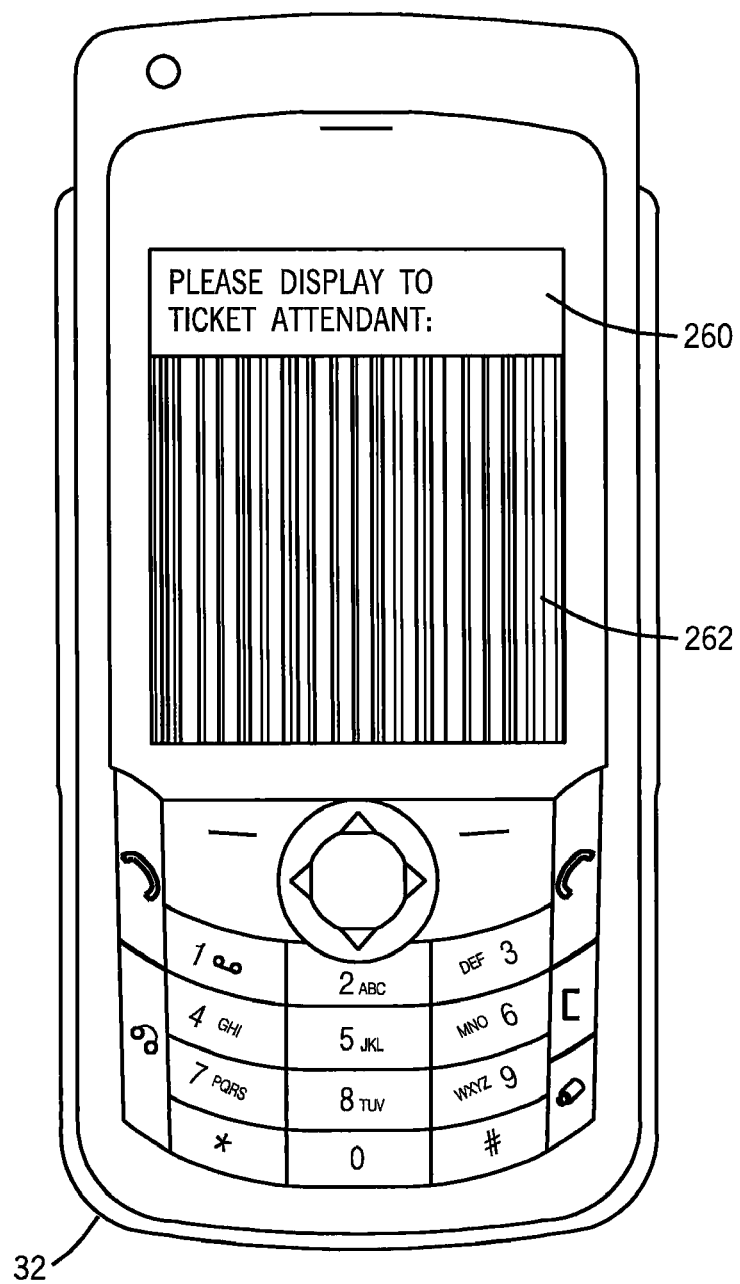
FIG. 13f illustrates a sixth example GUI screen of a mobile device showing a redemption system having a barcode.

Assuming that the customer accepts the delivery of the matched content, the particular offer is then shown, again according to a schedule which can be implemented through module 44. FIG. 13*e* illustrates the delivery of the matched content as shown in section 258, again with accompanying accept 242 and cancel 244 functionality. Turning to FIG. 13*f*, an example redemption system is shown with accompanying text in section 260, which instructs the customer to display the barcode (section 262) to the ticket attendant. System 12 has now uploaded the electronic ticket information to the mobile device 32, where a processing device located on device 32 converts the ticket data to the graphical barcode image seen. In the embodiment depicted, a ticket attendant can scan the mobile device 32 with a traditional barcode reader to provide authentication that the customer has purchased valid tickets over system 12.

Figure 14:
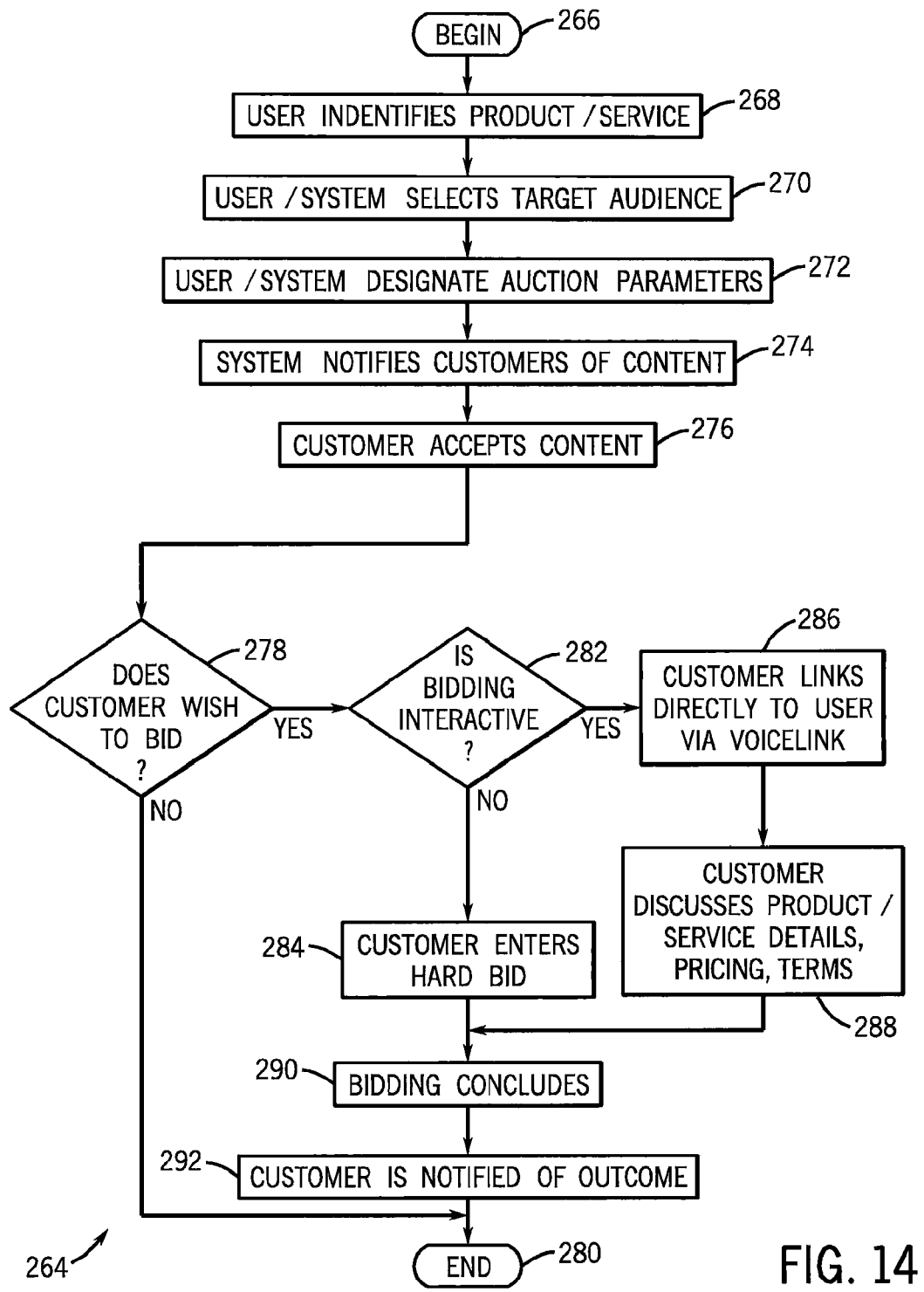
FIG. 14 illustrates an example method for implementing a personalized auction system in conjunction with a data management system.

FIG. 14 illustrates an additional, optional feature associated with system 12 and the delivery of content. Method 264 describes the process of executing and implementing an example bidding mechanism over system 12 which takes advantages of various features integrated into system 12 which have been previously described. Method 264 begins (step 266) by a user taking some step(s) to identify a respective product or service which is desired by the user to be marketed or sold to a customer using the bidding mechanism (step 268). The user can utilize subcomponents of system 12 to identify products or services which are "bid-eligible," or may be recommended by system 12 through the use of statistical analysis by database module 46 as products which, for example, have seen previous success as auction items using system 12. In one example, system 12 can include the example bidding mechanism/method 264 as part of the delivery of matched content shown in methods 206 (see FIG. 12) or similar.

Once a user (with or without the assistance of system 12) has identified a particular product or service to utilize the bid mechanism with, the user and/or system 12 selects a respective target audience for the product or service (step 270). In the example of delivery of matched content, the selection of a target audience may have been preliminarily defined, whereas the implementation of method 264 is aimed towards those customers who have accepted the delivery of matched content. In other words, the target audience may come to be defined or further defined through the content delivery process. In another example, a user can perform tasks similar to steps 134, 136, 138 and 140 (see FIG. 8) with the assistance of system 12 to identify a particular customer(s).

Depending on the product/service identified and the respective target audience selected, system 12 can also make educated recommendations as to auction parameters such as price, quantity, duration of auction, reserve price (or no reserve), and other similar auction parameters. A user can choose to select as much assistance from system 12 as he desires in the auction formation process. In keeping with the functional flexibility depicted in previous system 12 operations, a user can self-select virtually every aspect of a bidding transaction to suit a particular situation. Once auction parameters are designated (step 272), the system again notifies the target customer(s) of available content (step 274) in a manner similar to that previously described. Assuming that the customer accepts the auction content (step 276), the customer views the content, and does not wish to place a bid or otherwise participate in the auction (step 278), the method 264 then ends (step 280).

If a customer views the content and wishes to participate, various auction contents are is handled in different ways by system 12. If the bidding is not deemed to be "interactive content" or content which is not capable of being interactive (step 282), then a customer simply enters a "hard bid" (step 284). If interactive auction content is presented, system 12 incorporates an additional feature which here is termed "voicelink." Voicelink is a process which allows a user to directly link or otherwise communicate with a customer to perform tasks such as negotiating price, quantity or other terms, or to simply obtain more information about a particular product or service. If particular auction content is voicelink-capable, system 12 incorporates notification information into the auction content to let a customer know that the feature is available and to give the customer the option to link with the user, or a representative of the user.

In an example operation of voicelink, a customer may be presented with a particular model vehicle which has been sitting in a local dealer's inventory for several months, and the dealer has determined with the assistance of system 12 that the dealer should liquidate the vehicle. System 12 has identified certain target customers to send the auction information to, as well as related content such as audio and video which describe the car which was assembled by the user for a previous system 12 operation (earlier advertisement) and stored in database module 46 or elsewhere. Once the customer views the content, they are presented with a concluding screen which identifies auction parameters (e.g., reserve price, time of auction, number of people the auction content is being presented to, etc.). In the concluding screen can be an option to activate voicelink. The customer presses a button on mobile device 32 corresponding to voicelink to activate the service. The customer is presented with various voicelink choices which have been designated by a user for the instant auction. For the example operation described, the customer is presented with an option to speak with a representative about the vehicle itself (e.g., features, specifications, etc.). The customer is also presented with an option to speak with a representative to negotiate a "personal offer" which can be made by the customer. The customer chooses the personal offer option.

Choosing the personal offer option activates system 12 to use the phone features associated with mobile device 32. A call is placed to a private (perhaps undisclosed) line of a representative of the user/dealer who is given authority to negotiate an offer of purchase with certain restrictions. In another embodiment, an SMS message may be sent to the user representative using priority module 44 to inform the representative of a pending negotiation and to provide a contact number of the customer for the representative to call. The direct link is then made (voice channel, SMS, etc.) between user and customer to discuss the personal offer.

Returning to method 264, once the customer discusses product/service details, pricing, terms, and the like with the user or user representative (step 288), then again bidding concludes (step 290), and the customer is notified of the outcome (step 292). The method 264 then ends (step 280).

System 12 can perform various operations in conjunction with method 264 that have been previously described, such as assisting a user to define an appropriate target audience. System 12, at the conclusion of an auction, can again perform transaction reporting functions similar to step 150, FIG. 8 and step 230, FIG. 12 for the purposes of collecting, storing, and/or statistically analyzing data. System 12, with the permission of a respective user in some cases, can aggregate the data to assist system 12 in performing educated recommendations in future transactions.

Figure 15:
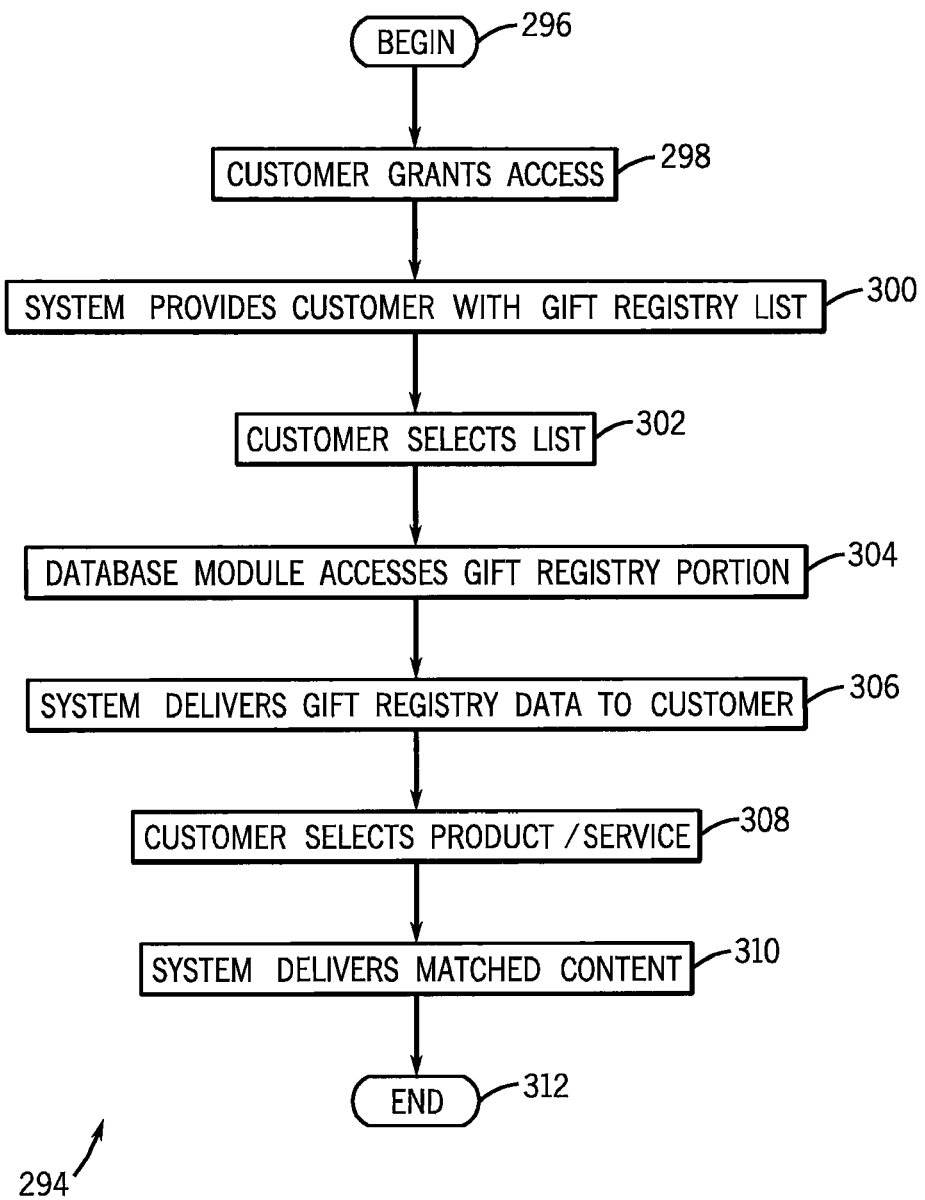
FIG. 15 illustrates an example method for implementing a gift registration system in conjunction with a data management system.

Turning to FIG. 15, an exemplary method 294 is described which performs an additional "gift registry" feature associated with system 12. System 12 can collect, organize, and distribute gift registry information to customers who agree to grant access from/to the system for gift registration purposes. Method 294 begins (step 296) by the process of a customer granting the access (step 298). In one embodiment, system 12 accesses database module 46 to determine friends, relatives, or other associates having a relationship link with the particular customer, and have agreed to share gift registration information as the customer has. System 12 then assembles the registration information which can be organized in various ways depending on a particular application, such as by name, type, organization or business, event (such as birthday, wedding, etc.), and the like. In one embodiment, the customer can choose a type of organization based on her preference.

Once the registration information is assembled, the system 12 provides the information to the customer (step 300) over the network 24 to device 32 where the information is viewed by the customer. The customer then selects a list, or other organization of information (step 302). In one embodiment, notification of the selection is transferred to the module 46 where a gift registry database is accessed (step 304). The database information, which may include related data such as images, text, sounds, etc., is then delivered to device 32 to the customer (step 306). The customer again views the information, and may select a particular product or service found therein (step 308). Again, in one embodiment, system 12 incorporates additional features previously described, such as facilitation of the delivery of matched content (step 310) to provide names of geographically-proximate vendors, for example, or to provide special offers from users for the selected product or service. The system 12 can continue to deliver matched content until the customer declines further content, again similar to the processes previously described.

The various processes, methods, and steps previously described can be implemented using software, firmware, and/or hardware or a combination of the foregoing which operates on system 10 and/or system 12. The systems 10 and 12 can implement software and firmware which executes on processing subcomponents, such as central processing unit 64 integrated into media server 60 (see FIGS. 4, 5). The software or firmware can be embodied in a computer program product which can be stored in non-volatile memory such as a hard drive, and/or removable or transferable memory such as flash memory. Software or firmware can be embodied in long-term storage media such as magnetic tapes, compact disks (CDs), digital video disks (DVDs), and the like. Steps such as providing a customer with a gift registry list (see step 300, FIG. 15) can be performed using software, hardware, or similar components thus described.

While one or more embodiments of the present invention have been illustrated in detail, the skilled artisan will appreciate that modifications and adaptations to those embodiments may be made without departing from the scope of the present invention as set forth in the following claims.

What is claimed is:

1. A content delivery system using a mobile device comprising:
   a user module configured to receive content-based incentives from a first user population including a first user, each content-based incentive including a scheduling parameter as to when the content-based incentive is to be delivered and a desired geographic location of target customers;
   a database module configured to determine a first customer population including a plurality of customers based on customer attributes, wherein the attributes include a desired delivery schedule as to when the plurality of customers desires to receive content-based incentives and a geographic location of the plurality of customers;
   a priority module configured to implement a content delivery schedule by matching the scheduling parameters and the desired geographic location of the content-based incentives to the attribute data of the first customer population; and
   a streaming module configured to deliver a content notification to the first customer population via a mobile device that the content-based incentives are available based on the matching of the content-based incentives to the attribute data.

2. The content delivery system of claim 1, wherein the priority module is further configured to select content-based incentives that the first customer population has an enhanced propensity for accepting when compared to an overall population.

3. The content delivery system of claim 2, wherein the enhanced propensity is based on lack of acceptance of prior content-based incentives by the first customer population.

4. The content delivery system of claim 2, wherein the priority module is further configured to send matched content to the first customer population, wherein a redemption mechanism is embedded in the matched content to allow the first customer population to redeem the incentive using the mobile device.

5. The content delivery system of claim 4, wherein the redemption mechanism includes ticket information for display on the mobile device.

6. The content delivery system of claim 4, wherein the redemption mechanism includes coupon information for display on the mobile device.

7. The content delivery system of claim 4, wherein the redemption mechanism includes bar code information for display on the mobile device.

8. The content delivery system of claim 2, whereupon if a respective customer of the first customer population affirmatively responds to the content notification, the priority module causes the system to send a redemption mechanism to the respective customer, the redemption mechanism enabling the respective customer to engage in a redemption activity using a mobile device.

9. The content delivery system of claim 8, wherein the redemption mechanism includes ticket information for display on the mobile device.

10. The content delivery system of claim 8, wherein the redemption mechanism includes coupon information for display on the mobile device.

11. The content delivery system of claim 8, wherein the redemption mechanism includes bar code information for display on the mobile device.

12. The content delivery system of claim 4, wherein the mobile device further includes a laptop computer, personal desktop assistant (PDA) or cellular phone device.

13. The content delivery system of claim 4, further comprising a customer interface configured to register the first customer population to become authorized to receive the content notification.

14. The content delivery system of claim 4, wherein the geographic location of the plurality of customers is calculated based on global positioning system (GPS) data.

15. The content delivery system of claim 2, wherein the enhanced propensity is based on acceptance of prior content-based incentives by the first customer population.

* * * * *